United States Patent [19]
Takahashi

[11] Patent Number: 5,986,812
[45] Date of Patent: *Nov. 16, 1999

[54] IMAGE DISPLAY APPARATUS

[75] Inventor: Junko Takahashi, Atsugi, Japan

[73] Assignee: Olympus Optical Co. Ltd., Tokyo, Japan

[*] Notice: This patent is subject to a terminal disclaimer.

[21] Appl. No.: 08/896,856

[22] Filed: Jul. 18, 1997

[30] Foreign Application Priority Data

Jul. 19, 1996 [JP] Japan ................................ 8-190644

[51] Int. Cl.$^6$ ............................................ G02B 27/14
[52] U.S. Cl. ........................ 359/630; 359/633; 359/631
[58] Field of Search .................................. 359/630, 631, 359/633, 637, 638, 639, 640

[56] References Cited

U.S. PATENT DOCUMENTS

| | | | |
|---|---|---|---|
| Re. 27,356 | 5/1972 | Russa ........................ | 359/494 |
| 4,026,641 | 5/1977 | Bossemian et al. ........ | 359/869 |
| 4,322,135 | 3/1982 | Freeman ................... | 359/643 |
| 4,669,810 | 6/1987 | Wood ........................ | 340/908 |
| 4,969,724 | 11/1990 | Ellis ........................... | 359/364 |
| 5,093,567 | 3/1992 | Staveley ................... | 250/221 |
| 5,453,877 | 9/1995 | Gerbe et al. .............. | 359/633 |
| 5,699,194 | 12/1997 | Takahashi ................. | 359/633 |
| 5,701,202 | 12/1997 | Takahashi ................. | 359/631 |
| 5,706,136 | 1/1998 | Okuyama et al. ......... | 359/630 |

FOREIGN PATENT DOCUMENTS

| | | |
|---|---|---|
| 583116 | 2/1994 | European Pat. Off. . |
| 687932 | 12/1995 | European Pat. Off. . |
| 730 183 | 9/1996 | European Pat. Off. . |
| 62-214782 | 9/1987 | Japan . |
| 3-101709 | 4/1991 | Japan . |
| 7-333551 | 12/1995 | Japan . |

Primary Examiner—Georgia Epps
Assistant Examiner—Ricky Mack
Attorney, Agent, or Firm—Pillsbury Madison & Sutro, LLP

[57] ABSTRACT

A head-mounted image display apparatus capable of providing an observation image which is clear and has minimal distortion even at a wide field angle. Display light from an image display device (7) enters an optical system (8) through a first surface (3) serving as both transmitting and reflecting surfaces. The incident light is reflected by a third surface (5) and further reflected by the first surface (3). Then, the reflected light is reflected by a second surface 4 which is a decentered reflecting surface disposed on an optical axis (2) to face an exit pupil (1). The reflected light exits from the optical system (8) through the first surface (3), travels along the optical axis (2) and enters an observer's pupil placed at the exit pupil (1), without forming an intermediate image, thus forming a display image on the retina of the observer's eye. The first to third surfaces (3 to 5) are each formed from a plane-symmetry three-dimensional surface having no axis of rotational symmetry in nor out of the surface and having only one plane of symmetry.

33 Claims, 11 Drawing Sheets

IMAGE DISPLAY APPARATUS

BACKGROUND OF THE INVENTION

1. Field of the Invention

The present invention relates to a head-mounted image display apparatus and, more particularly, to an image display apparatus that can be retained on the observer's head or face.

2. Related Art

As an example of a conventional head- or face-mounted image display apparatus, an image display apparatus disclosed in Japanese Patent Application Unexamined Publication (KOKAI) No. 3-101709 (1991) is known. FIG. 15(a) shows the entire optical system of the conventional image display apparatus, and FIG. 15(b) shows a part of an ocular optical system used in the image display apparatus. As illustrated in these figures, in the conventional image display apparatus, an image that is displayed by an image display device is transmitted as an aerial image by a relay optical system including a positive lens, and the aerial image is projected into an observer's eyeball as an enlarged image by an ocular optical system formed from a concave reflecting mirror.

U.S. Pat. No. 4,669,810 discloses another type of convention image display apparatus. In this apparatus, as shown in FIG. 16, an image of a CRT is transmitted through a relay optical system to form an intermediate image, and the image is projected into an observer's eye by a combination of a reflection holographic element and a combiner having a hologram surface.

Japanese Patent Application Unexamined Publication (KOKAI) No. 62-214782 (1987) discloses another type of conventional image display apparatus. As shown in FIGS. 17(a) and 17(b), the conventional image display apparatus is designed to enable an image of an image display device to be directly observed as an enlarged image through an ocular lens.

U.S. Pat. No. 4,026,641 discloses another type of conventional image display apparatus. In the conventional image display apparatus, as shown in FIG. 18, an image of an image display device is transferred to a curved object surface by an image transfer device, and the image transferred to the object surface is projected in the air by a toric reflector.

Reissued U.S. Pat. No. 27,356 discloses another type of conventional image display apparatus. As shown in FIG. 19, the apparatus is an ocular optical system designed to project an object surface onto an exit pupil by a semitransparent concave mirror and a semitransparent plane mirror.

Other known image display apparatuses include those which are disclosed in U.S. Pat. Nos. 4,322,135 and 4,969,724, European Patent No. 0,583,116A2, and Japanese Patent Application Unexamined Publication (KOKAI) No. 7-333551 (1995).

In these conventional techniques, however, a reflecting surface and a transmitting surface, which constitute an optical system, are formed by using a spherical surface, a rotationally symmetric aspherical surface, a toric surface, an anamorphic surface, etc. Therefore, it has heretofore been impossible to favorably correct ray aberration and distortion at the same time.

If an image for observation is not favorably corrected for both aberration and distortion, the image is distorted as it is viewed by an observer. If the observation image is distorted such that images viewed with the user's left and right eyes are not in symmetry with each other, the two images cannot properly be fused into a single image. In the case of displaying a figure or the like, the displayed figure appears to be distorted, making it impossible to correctly recognize the shape of the displayed figure.

SUMMARY OF THE INVENTION

In view of the above-described problems of conventional devices, an object of the present invention is to provide a head-mounted image display apparatus that is capable of providing an observation image which is clear and has minimal distortion, even at a wide field angle.

To attain the above-described object, the present invention provides an image display apparatus having an image display device and an ocular optical system for leading an image formed by the image display device to the position of an eyeball of an observer without forming an intermediate image so that the image can be observed as a virtual image. The ocular optical system includes a prism member formed of a medium having a refractive index (n) larger than 1.2 (n>1.2). The prism member has at least two surfaces that have a reflecting action. The at least two surfaces are arranged such that light rays entering the prism member are internally reflected at least three times. At least one of the at least two surfaces having a reflecting action is formed from a curved surface having an action by which a distortion due to decentration is corrected to such an extent that the distortion does not discomfort the observer. The curved surface is a plane-symmetry three-dimensional surface with a rotationally asymmetric surface configuration having only one plane of symmetry.

The surface configuration of the above-described plane-symmetry three-dimensional surface may be expressed by the following defining equation (a):

$$Z = C_2 + C_3 y + C_4 x + C_5 y^2 + C_6 yx + C_7 x^2 + C_8 y^3 + \quad \text{(a)}$$
$$C_9 y^2 x + C_{10} yx^2 + C_{11} x^3 + C_{12} y^4 + C_{13} y^3 x + C_{14} y^2 x^2 +$$
$$C_{15} yx^3 + C_{16} x^4 + C_{17} y^5 + C_{18} y^4 x + C_{19} y^3 x^2 + C_{20} y^2 x^3 +$$
$$C_{21} yx^4 + C_{22} x^5 + C_{23} y^6 + C_{24} y^5 x + C_{25} y^4 x^2 + C_{26} y^3 x^3 +$$
$$C_{27} y^2 x^4 + C_{28} yx^5 + C_{29} x^6 + C_{30} y^7 + C_{31} y^6 x + C_{32} y^5 x^2 +$$
$$C_{33} y^4 x^3 + C_{34} y^3 x^4 + C_{35} y^2 x^5 + C_{36} yx^6 + C_{37} x^7 + \ldots$$

It is desirable that the plane-symmetry three-dimensional surface should be either a three-dimensional surface arranged to have only one plane of symmetry parallel to the YZ-plane by setting the coefficients ($C_4$, $C_6$, $C_9$, $C_{11}$, $C_{13}$, $C_{15}$, $C_{18}$, $C_{20}$, $C_{22}$, $C_{24}$, $C_{26}$, $C_{28}$, $C_{31}$, $C_{33}$, $C_{35}$, $C_{37}$, ...) of all terms with odd-numbered powers of x in the defining equation (a) equal to zero, or a three-dimensional surface arranged to have only one plane of symmetry parallel to the XZ-plane by setting the coefficients ($C_3$, $C_6$, $C_8$, $C_{10}$, $C_{13}$, $C_{15}$, $C_{17}$, $C_{19}$, $C_{21}$, $C_{24}$, $C_{26}$, $C_{28}$, $C_{30}$, $C_{32}$, $C_{34}$, $C_{36}$, ...) of all terms with odd-numbered powers of y equal to zero.

The above-described image display apparatus may be arranged as a head-mounted image display apparatus in which the image display apparatus is disposed in a body unit that covers the apparatus, and the body unit is provided with a support member that supports the body unit on the observer's head.

It is desirable for the prism member to have at least three optical surfaces that reflect and/or transmit light emitted from the image display device.

The reasons why the present invention adopts the above-described arrangements, particularly the arrangement in which a plane-symmetry three-dimensional surface is used in an ocular optical system of a head-mounted image display apparatus, together with the functions thereof, will be explained below.

For the convenience of explanation, first, typical ocular optical systems which may be used in a head-mounted image display apparatus according to the present invention will be illustrated with FIGS. 11 to 12.

In FIG. 11, an ocular optical system 8 comprises a first surface 3, a second surface 4, a third surface 5, and a fourth surface 6. A bundle of light rays emitted from an image display device 7 enters the ocular optical system 8 while being refracted by the third surface 5. Then, the ray bundle is internally reflected by the fourth surface 6 and further internally reflected by the third surface 5. Then, the ray bundle is internally reflected by the second surface 4 and refracted by the first surface 3 so as to be projected into an observer's eyeball with the observer's iris position or eyeball rolling center as an exit pupil 1.

In FIG. 12, an ocular optical system 8 comprises a first surface 3, a second surface 4, and a third surface 5. A bundle of light rays emitted from an image display device 7 enters the ocular optical system 8 while being refracted by the third surface 5. Then, the ray bundle is internally reflected by the second surface 4 and further internally reflected by the first surface 3. Then, the ray bundle is reflected by the second surface 4 again and refracted by the first surface 3 so as to be projected into an observer's eyeball with the observer's iris position or eyeball rolling center as an exit pupil 1.

Thus, in the present invention, the surface numbers (hereinafter referred to as "surface Nos.") of the ocular optical system 8 are, in principle, given as ordinal numbers in backward ray tracing from the exit pupil 1 to the image display device 7. Typically, the present invention will be described on the assumption that it is applied to the ocular optical system 8 shown in FIG. 11. It should, however, be noted that the present invention is not necessarily limited to the optical system shown in FIG. 11, but may also be applied to the optical systems shown in FIGS. 11 and 12, and to other known optical systems.

Next, a coordinate system used in the following description will be explained.

As shown in FIG. 11, a visual axis 2 is defined by a straight line along which an axial principal ray that emanates from the center of the exit pupil 1 to reach the center of the image display device 7, as an image display device for forming an image to be observed, travels until it intersects the first surface 3 of the ocular optical system 8. The visual axis 2 is defined as a Z-axis. An axis which perpendicularly intersects the Z-axis and which lies in a plane of decentration of each surface constituting the ocular optical system 8 is defined as a Y-axis. An axis which perpendicularly intersects both the visual axis 2 and the Y-axis is defined as an X-axis.

The following explanation will be made on the basis of backward ray tracing in which light rays are traced from the pupil 1 toward the image display device 7 for forming an image to be observed, unless otherwise specified.

In general, aspherical surfaces are used in order to effect favorable aberration correction with a minimal number of surfaces. Spherical lens systems generally adopt an arrangement in which aberrations produced by a spherical surface, such as spherical aberration, coma, and field curvature, are corrected by another surface. In order to reduce various aberrations which would be produced by a spherical surface, an aspherical surface is used. The purpose of using an aspherical surface is to reduce various aberrations which would be produced by one surface and to minimize the number of surfaces used to effect aberration correction, thereby minimizing the number of surfaces constituting the whole optical system.

However, an optical system which is decentered, as in the case of an ocular optical system used in a head-mounted image display apparatus according to the present invention, suffers from aberrations due to decentration which cannot be corrected by a conventionally employed rotationally symmetric aspherical surface. Aberrations due to decentration include coma, astigmatism, image distortion, field curvature, etc. There are conventional examples in which a toric surface, an anamorphic surface, etc. are used to correct such aberrations. However, in the conventional examples, great importance has been placed on the correction of astigmatism caused by decentration, and there has heretofore been proposed no device which is compact and provides a wide field angle and which is satisfactorily corrected for aberrations, including image distortion.

Let us introduce aberration correction techniques proposed so far:

It is stated in detail in Japanese Patent Application No. 5-264828 (1993), filed by the present applicant, that a combination of a concave mirror and a convex mirror exhibits favorable effect in correction of field curvature. Correction of aberration produced by a tilted concave mirror is described, for example, in Japanese Patent Application No. 6-127453 (1994).

Correction of astigmatism produced by a tilted concave mirror is described in Japanese Patent Application No. 6-211067 (1994), filed by the present applicant, and also in Japanese Patent Application No. 6-256676 (1994).

Correction of trapezoidal and bow-shaped image distortions produced by a tilted concave mirror is described in Japanese Patent Application Unexamined Publication (KOKAI) No. 5-303056 (1993).

However, it has heretofore been impossible to correct these aberrations simultaneously and favorably by using a toric surface, an anamorphic surface, a rotationally symmetric aspherical surface, or a spherical surface.

The present invention is characterized by using a plane-symmetry three-dimensional surface which has no axis of rotational symmetry in nor out of the surface and which has only one plane of symmetry to correct the above-described aberrations simultaneously and favorably.

The term "three-dimensional surface" as used in the present invention means a surface which is defined by the following equation:

$$Z = C_2 + C_3 y + C_4 x + C_5 y^2 + C_6 yx + C_7 x^2 + C_8 y^3 + \quad (a)$$
$$C_9 y^2 x + C_{10} yx^2 + C_{11} x^3 + C_{12} y^4 + C_{13} y^3 x + C_{14} y^2 x^2 +$$
$$C_{15} yx^3 + C_{16} x^4 + C_{17} y^5 + C_{18} y^4 x + C_{19} y^3 x^2 + C_{20} y^2 x^3 +$$
$$C_{21} yx^4 + C_{22} x^5 + C_{23} y^6 + C_{24} y^5 x + C_{25} y^4 x^2 + C_{26} y^3 x^3 +$$
$$C_{27} y^2 x^4 + C_{28} yx^5 + C_{29} x^6 + C_{30} y^7 + C_{31} y^6 x + C_{32} y^5 x^2 +$$
$$C_{33} y^4 x^3 + C_{34} y^3 x^4 + C_{35} y^2 x^5 + C_{36} yx^6 + C_{37} x^7 + \ldots$$

By using such a three-dimensional surface as at least one reflecting surface having a reflecting action, a tilted reflecting surface, e.g. the second surface in Examples (described later), can be given a desired tilt in the Y-axis direction at a desired position on the X-axis in the above-described coordinate system, in which: the direction of decentration is defined as a Y-axis; the direction of the observer's visual axis is defined as a Z-axis; and an axis that perpendicularly intersects both the Y- and Z-axes is defined as an X-axis. By doing so, it is possible to correct image distortions produced by a decentered concave mirror, particularly an image distortion which occurs in the Y-axis direction, varying according to the image height in the X-axis direction. Consequently, it becomes possible to favorably correct an image distortion in which the horizontal line is observed as being a bow-shaped line.

Next, a trapezoidal distortion produced by a decentered concave mirror will be explained. Let us explain the image distortion by backward ray tracing from the observer's eyeball. Light rays emanating from the eyeball divergently in the X-axis direction are reflected by the second surface, which is decentered, by way of example. At this time, light rays striking the second surface in the positive direction of the Y-axis and light rays striking the second surface in the negative direction of the Y-axis are reflected by the second surface after a considerable difference has been produced between these light rays in terms of divergence in the X-axis direction due to the difference in optical path length between them. Consequently, an image to be observed is formed with a difference in size between an image lying in the positive direction of the Y-axis and an image in the negative direction of the Y-axis. As a result, the observation image has a trapezoidal distortion.

This distortion is produced by a decentered concave mirror. Therefore, a similar trapezoidal distortion is produced not only by the second surface but also by any decentered reflecting surface of the ocular optical system.

The trapezoidal distortion can also be corrected by using a three-dimensional surface. This is because, as will be clear from the defining equation (a), a three-dimensional surface has terms with odd-numbered powers of Y and terms with even-numbered powers of X, which enable the curvature to be changed in the X-axis direction as desired according to the sign (positive or negative) of the Y-axis.

Next, a rotationally symmetric image distortion will be explained. For example, in an optical system which has a pupil lying away from a second surface, which is a concave surface, and which provides a wide field angle as in the ocular optical system according to the present invention, a rotationally symmetric pincushion distortion occurs to a considerable extent in backward ray tracing from the pupil plane side. The occurrence of such an image distortion can be suppressed by increasing the tilt of the peripheral portions of the reflecting surface.

Next, a rotationally asymmetric field curvature produced by a decentered concave mirror will be explained. Let us explain the field curvature by backward ray tracing from the observer's eyeball. Light rays emanating from the eyeball divergently in the X-axis direction are reflected by the decentered second surface. The distance to the image surface (i.e. the image display device) from a point on which a light ray impinges is a half of the curvature at the portion on which the light ray impinges. That is, the light rays form an image surface which is tilted with respect to the direction of travel of light rays having been reflected from the decentered concave mirror. Using a three-dimensional surface according to the present invention makes it possible to give desired curvatures in the X- and Y-axis directions at any point relative to the positive and negative directions of the Y-axis. This is because, as will be clear from the defining equation (a), the three-dimensional surface has odd-numbered powers of Y which enable the curvature to be varied as desired according to the sign (positive or negative) of the Y-axis. This is effective in correcting a rotationally asymmetric field curvature, particularly the tilt of the image surface, produced by a decentered concave mirror.

Next, a rotationally symmetric field curvature will be explained. In general, a reflecting mirror produces a curvature of field along the reflecting surface. Ocular optical systems according to the present invention are generally arranged such that the field curvature can be corrected by a convex mirror which pairs with a concave mirror as stated above. However, the field curvature cannot be completely corrected because the number of surfaces is small. It is preferable in order to correct the field curvature left uncorrected to use a three-dimensional surface according to the present invention, which enables a desired curvature to be given at any position.

Astigmatism can be corrected by appropriately changing the difference between the second-order differential or curvature in the X-axis direction and the second-order differential or curvature in the Y-axis direction.

Coma can be corrected by giving a desired tilt in the Y-axis direction at any point on the X-axis on the basis of the same idea as that for a bow-shaped image distortion described above.

In view of the productivity of optical parts, it is even more desirable to minimize the number of three-dimensional surfaces used. Accordingly, it is preferable to use a plane surface or a spherical surface or a decentered rotationally symmetric surface as at least one of the reflecting surfaces constituting the ocular optical system. By doing so, it is possible to improve the productivity.

Of the three reflecting surfaces constituting the ocular optical system, a surface having a strong reflective refracting power in comparison to the other surfaces is preferably formed from a three-dimensional surface. This is effective when it is desired to suppress the occurrence of aberration.

It is possible to suppress the occurrence of comatic aberration by using a three-dimensional surface as a surface serving as both refracting and reflecting surfaces in the group of surfaces constituting the ocular optical system. This is because the surface serving as both refracting and reflecting surfaces is tilted to a considerable extent with respect to the axial principal ray when it acts as a reflecting surface.

By using a three-dimensional surface as a surface facing the image display device, image distortion can be corrected. The reason for this is that the surface facing the image display device is disposed close to the image formation position and therefore enables image distortion to be favorably corrected without aggravating other aberrations.

By using two three-dimensional surfaces for two of the surfaces constituting the ocular optical system, various aberrations can be corrected even more effectively.

By increasing the number of three-dimensional surfaces used in the ocular optical system within the number of surfaces constituting it, even more favorable aberration correction can be made.

In the present invention, the above-described three-dimensional surface is used as at least one reflecting surface having at reflecting action, and the surface configuration of the reflecting surface is defined as a plane-symmetry three-dimensional surface which has no axis of rotational symmetry in nor out of the surface and which has only one plane of symmetry. More specifically, when a coordinate system is set as shown for example in FIG. 11, the reflecting surface is formed as a three-dimensional surface having a plane of symmetry lying in the YZ-plane, which is a plane containing the direction of decentration of the decentered surfaces. By doing so, the image formed on the image-formation plane in the backward ray tracing can be made symmetric with respect to the YZ-plane as a plane of symmetry. Thus, the cost for aberration correction can be reduced to a considerable extent.

It should be noted that the term "a reflecting surface having a reflecting action" as used in the present invention includes any reflecting surface having a reflective action, e.g. a totally reflecting surface, a mirror-coated surface, a semitransparent reflecting surface, etc.

When a plane-symmetry three-dimensional surface having only one plane of symmetry is used as at least one reflecting surface of an ocular optical system as stated above, it is possible to provide an ocular optical system having a wide field angle and favorably corrected for aberrations by satisfying the following conditions.

First, when X-, Y- and Z-axes are determined according to the above definition, six principal rays among those which emanate from the center of the pupil position and enter the image display device are determined by combinations of field angles in the directions X and Y, i.e. the field angle zero in the direction X, the maximum field angle in the direction X, the maximum field angle in the direction +Y, the field angle zero in the direction Y, and the maximum field angle in the direction −Y, as shown in Table 1 below:

TABLE 1

|  | Field angle zero in direction X | Maximum field angle in direction X |
|---|---|---|
| Maximum field angle in direction +Y | ① | ④ |
| Field angle zero in direction Y | ② | ⑤ |
| Maximum field angle in direction −Y | ③ | ⑥ |

As shown in the above Table 1, six principal rays are determined. That is, an axial principal ray emanating from the pupil center and reaching the center of the image field is defined as ②; a principal ray in a field angle direction corresponding to the center of the upper edge of the image field is defined as ①; a principal ray in a field angle direction corresponding to the upper-right corner of the image field is defined as ④; a principal ray in a field angle direction corresponding to the center of the right-hand edge of the image field is defined as ⑤; a principal ray in a field angle direction corresponding to the lower-right corner of the image field is defined as ⑥; and a principal ray in a field angle direction corresponding to the center of the lower edge of the image field is defined by ③. An area where the principal rays ① to ⑥ intersect each particular surface is defined as an effective area. An equation which defines the configuration of each particular surface [i.e. an expression in which the Z-axis is expressed as an axis of the surface, or an expression in which the surface is expressed in the form of Z=f(X,Y) on the assumption that the surface is not decentered] is solved to determine tilts in the Y-axis direction, which corresponds to the decentering direction, of the surface at respective positions where the principal rays ① to ⑥ impinge on the surface in the effective area. The tilts are denoted by DY1 to DY6, and the curvatures in the Y-axis direction at these positions are denoted by CY1 to CY6. The tilts of the surface at these positions in the X-axis direction, which perpendicularly intersects the Y-axis direction, are denoted by DX1 to DX6, and the curvatures in the X-axis direction at these positions are denoted by CX1 to CX6.

Assuming that CX2 and CY2 denote curvatures in the X- and Y-axis directions, respectively, of that portion of at least one reflecting surface constituting the ocular optical system which is struck by the axial principal ray ② passing through the center of the exit pupil of the ocular optical system and reaching the center of the image to be observed, it is desirable to satisfy both the following conditions:

$$0.001 < |CX2| \text{ (1/millimeter)} \quad (A\text{-}1)$$

$$0.001 < |CY2| \text{ (1/millimeter)} \quad (B\text{-}1)$$

These conditions are set because the distance between the pupil and the image-formation plane (i.e. the display plane of the image display device) can be reduced and thus a compact and lightweight head-mounted image display apparatus can be constructed by setting the reflective refracting power for the axial principal ray of a reflecting surface as a plane-symmetry three-dimensional surface to a value other than zero. If |CX2| or |CY2| is not larger than the lower limit, i.e. 0.001, it becomes difficult to construct a compact ocular optical system.

It is more desirable to satisfy both of the following conditions:

$$0.005 < |CX2| \text{ (1/millimeter)} \quad (A\text{-}2)$$

$$0.005 < |CY2| \text{ (1/millimeter)} \quad (B\text{-}2)$$

By satisfying both of the above conditions, a plane-symmetry three-dimensional surface according to the present invention can be effectively introduced into a concave mirror as a surface assigned the largest refracting power in the ocular optical system of the head-mounted image display apparatus, thereby making it possible to favorably correct various aberrations in the entire system, e.g. image distortion, astigmatism, and coma.

It is even more desirable that other reflecting surfaces in the ocular optical system or all the reflecting surfaces should satisfy the above conditions.

Assuming that CY2 and CX2 denote curvatures in the Y- and X-axis directions, respectively, of that portion of at least one reflecting surface constituting the ocular optical system which is struck by the axial principal ray ② passing through the center of the exit pupil and reaching the center of the image to be observed, it is desirable to satisfy the following condition:

$$0.05 < |CX2/CY2| < 8 \quad (1\text{-}1)$$

It is necessary to satisfy the condition (1-1) in order to reduce astigmatism produced by a decentered reflecting surface. In the case of a spherical surface, CX2/CY2=1. However, a decentered spherical surface produces a large amount of aberration such as image distortion, astigmatism, and coma. Therefore, if a decentered surface is formed by using a spherical surface, it is difficult to completely correct astigmatism on the optical axis, and the residual astigmatism makes it difficult to view a clear observation image even at the center of the visual field. Only when a reflecting surface that has the largest reflective refracting power in the optical system is formed from a surface that has only one plane of symmetry and the condition (1-1) is satisfied, does it become possible to correct the aberrations favorably and to view an observation image that has no astigmatism, even on the optical axis. The upper limit of the condition (1-1), i.e. 8, and the lower limit, i.e. 0.05, are the limits within which astigmatism can be prevented from occurring to a considerable extent.

It is more desirable to satisfy the following condition:

$$0.1 < |CX2/CY2| < 3.5 \qquad (1\text{-}2)$$

It is even more desirable to satisfy the following condition:

$$0.5 < |CX2/CY2| < 3.5 \qquad (1\text{-}3)$$

It is still more desirable to satisfy the following condition:

$$1.0 < |CX2/CY2| < 1.90 \qquad (1\text{-}4)$$

It is desirable that a surface having the largest reflective refracting power in the optical system should satisfy at least one of the above conditions. It is more desirable that all the reflecting surfaces should satisfy at least one of the above conditions.

The meaning of the upper and lower limits of the above conditions (1-2) to (1-4) is the same as in the case of the condition (1-1). However, the tolerance of astigmatism varies according to the pupil diameter of the observer's eyeball, which changes with the brightness of the image for observation. Therefore, the larger the pupil diameter, the more desirable it becomes to satisfy the condition (1-4).

Next, conditions concerning the reflective refracting power of a reflecting surface will be shown. In a decentered optical system according to the present invention in which the principal refracting power of the whole optical system is given to a reflecting surface, which is a feature of the present invention, that are different for each image position are produced. Therefore, it is necessary to correct various aberrations by changing the configuration of the reflecting surface. The amount of correction to be made varies subtly from place to place on the reflecting surface. Accordingly, it is important that a surface having the strongest refracting power in the ocular optical system should satisfy the following condition.

Assuming that CXn2 denotes each value of the differences CXn−CX2, where CX2 is the curvature in the X-axis direction of that portion of a reflecting surface having the strongest reflective refracting power in the optical system which reflects the axial principal ray ②, and CXn (n is 1, and 3 to 6) are the curvatures in the X-axis direction of portions of the surface on which the rays ①, and ③ to ⑥ passing at the maximum observation field angles impinge, respectively, it is desirable from the viewpoint of aberration correction that all the values CXn2 should satisfy the following condition:

$$-0.05 < CXn2 < 0.05 \text{ (1/millimeter)} \qquad (2\text{-}1)$$

A spherical surface satisfies the above condition. However, if a decentered surface is formed by using a spherical surface, it is difficult to completely correct astigmatism on the optical axis, and the residual astigmatism makes it difficult to view a clear observation image even at the center of the visual field, as stated above. Only when a reflecting surface that has the largest reflective refracting power in the optical system is formed from a surface that has only one plane of symmetry and the condition (2-1) is satisfied, does it become possible to correct the aberrations favorably and to view an observation image that has no astigmatism, even on the optical axis.

If CXn2 is not smaller than the upper limit of the condition (2-1), i.e. 0.05, or not larger than the lower limit, i.e. −0.05, the curvatures of the surface in the effective area become excessively different from each other. Consequently, the curvature of the whole effective area of the surface having the principal reflective refracting power in the ocular optical system undesirably varies to an excessively large extent, making it impossible to observe a wide and flat image throughout the observation field angle.

It is more desirable to satisfy the following condition:

$$-0.01 < CXn2 < 0.01 \text{ (1/millimeter)} \qquad (2\text{-}2)$$

It is important to satisfy the condition (2-2) when the observation field angle exceeds 20 degrees.

It is even more desirable to satisfy the following condition:

$$-0.005 < CXn2 < 0.006 \text{ (1/millimeter)} \qquad (2\text{-}3)$$

It is important to satisfy the condition (2-3) when the observation field angle exceeds 30 degrees. Both of the conditions (2-2) and (2-3) are necessary to be satisfied in order to obtain a favorable image at a wide observation field angle.

It is still more desirable that all of the reflecting surfaces should satisfy the following condition.

Assuming that CXn2 denotes each value of the differences CXn−CX2, as in the case of the above definition, it is desirable from the viewpoint of aberration correction that all the values CXn2 at all the reflecting surfaces should satisfy the following condition:

$$-0.1 < CXn2 < 0.05 \text{ (1/millimeter)} \qquad (2\text{-}4)$$

If CXn2 is not smaller than the upper limit of the condition (2-4), i.e. 0.05, or not larger than the lower limit, i.e. −0.1, it becomes impossible to observe a wide and flat image throughout the observation field angle for the same reasons stated above with respect to the condition (2-1).

It is more desirable to satisfy the following condition:

$$-0.1 < CXn2 < 0.02 \text{ (1/millimeter)} \qquad (2\text{-}5)$$

It is important to satisfy the condition (2-5) when the observation field angle exceeds 20 degrees.

It is even more desirable to satisfy the following condition:

$$-0.05 < CXn2 < 0.01 \text{ (1/millimeter)} \qquad (2\text{-}6)$$

It is important to satisfy the condition (2-6) when the observation field angle exceeds 30 degrees. Both of the conditions (2-5) and (2-6) are necessary to be satisfied in order to obtain a favorable image at a wide observation field angle.

It is still more desirable that the reflecting surface that has the strongest reflective refracting power in the optical system should satisfy at least one of the following conditions:

$$0.0001 < |CXn2| < 0.05 \text{ (1/millimeter)} \qquad (2\text{-}1')$$

$$0.0001 < |CXn2| < 0.01 \text{ (1/millimeter)} \qquad (2\text{-}2')$$

$$0.0001 < |CXn2| < 0.006 \text{ (1/millimeter)} \qquad (2\text{-}3')$$

It is still more desirable that all the reflecting surfaces should satisfy at least one of the following conditions:

$$0.0001 < |CXn2| < 0.05 \text{ (1/millimeter)} \qquad (2\text{-}4')$$

$$0.0001 < |CXn2| < 0.02 \text{ (1/millimeter)} \qquad (2\text{-}5')$$

$$0.0001 < |CXn2| < 0.01 \text{ (1/millimeter)} \qquad (2\text{-}6')$$

Assuming that CYn2 denotes each value of the differences CYn−CY2, where CY2 is the curvature in the Y-axis direction of that portion of a reflecting surface that has the strongest reflective refracting power in the optical system which reflects the axial principal ray ②, and CYn (n is 1, and 3 to 6) are the curvatures in the Y-axis direction of portions of the surface on which the rays ①, and ③ to ⑥ passing at the maximum observation field angles impinge, respectively, as in the case of the condition (2-1), it is desirable from the viewpoint of aberration correction that all the values CYn2 should satisfy the following condition:

$$0<|CYn2|<0.05 \text{ (1/millimeter)} \qquad (3\text{-}1)$$

A spherical surface satisfies the above condition. However, if a spherical surface is used, astigmatism, field curvature and other aberrations are produced to a considerable extent for the same reasons stated above with respect to the condition (2-1).

If |CYn2| is not smaller than the upper limit of the condition (3-1), i.e. 0.05, or not larger than the lower limit, i.e. 0, the curvatures of the surface in the effective area become excessively different from each other. Consequently, the curvature of the whole effective area of the surface having the principal reflective refracting power in the ocular optical system undesirably varies to an excessively large extent, making it impossible to observe a wide and flat image throughout the observation field angle.

It is more desirable to satisfy the following condition:

$$0<|CYn2|<0.03 \text{ (1/millimeter)} \qquad (3\text{-}2)$$

It is important to satisfy the condition (3-2) when the observation field angle exceeds 20 degrees.

It is even more desirable to satisfy the following condition:

$$0<|CYn2|<0.01 \text{ (1/millimeter)} \qquad (3\text{-}3)$$

It is important to satisfy the condition (3-3) when the observation field angle exceeds 30 degrees. Both the conditions (3-2) and (3-3) are necessary to satisfy in order to obtain a favorable image at a wide observation field angle.

It is still more desirable that all the reflecting surfaces should satisfy the following condition.

Assuming that CYn2 denotes each value of the differences CYn−CY2 as in the case of the above definition, it is desirable from the viewpoint of aberration correction that all the values CYn2 at all the reflecting surfaces should satisfy the following condition:

$$0<|CYn2|<0.05 \text{ (1/millimeter)} \qquad (3\text{-}4)$$

If |CYn2| is not smaller than the upper limit of the condition (3-4), i.e. 0.05, or not larger than the lower limit, i.e. 0, it becomes impossible to observe a wide and flat image throughout the observation field angle for the same reasons stated above with respect to the condition (3-1).

It is more desirable to satisfy the following condition:

$$0<|CYn2|<0.03 \text{ (1/millimeter)} \qquad (3\text{-}5)$$

It is important to satisfy the condition (3-5) when the observation field angle is about 20 degrees.

It is even more desirable to satisfy the following condition:

$$0<|CYn2|<0.01 \text{ (1/millimeter)} \qquad (3\text{-}6)$$

It is important to satisfy the condition (3-6) when the observation field angle is about 30 degrees.

Both the conditions (3-5) and (3-6) are necessary to satisfy in order to obtain a favorable image at a wide observation field angle.

It is still more desirable that the reflecting surface having the strongest reflective refracting power in the optical system should satisfy at least one of the following conditions:

$$0.0001<|CYn2|<0.05 \text{ (1/millimeter)} \qquad (3\text{-}1')$$

$$0.0001<|CYn2|<0.03 \text{ (1/millimeter)} \qquad (3\text{-}2')$$

$$0.0001<|CYn2|<0.01 \text{ (1/millimeter)} \qquad (3\text{-}3')$$

It is still more desirable that all the reflecting surfaces should satisfy at least one of the following conditions:

$$0.0001<|CYn2|<0.05 \text{ (1/millimeter)} \qquad (3\text{-}4')$$

$$0.0001<|CYn2|<0.03 \text{ (1/millimeter)} \qquad (3\text{-}5')$$

$$0.0001<|CYn2|<0.01 \text{ (1/millimeter)} \qquad (3\text{-}6')$$

Next, assuming that CXYM denotes the ratio of the curvature in the X-axis direction to the curvature in the Y-axis direction, i.e. |CXn|/|CYn| (n is any of 1 to 6), of the surface having the strongest reflective refracting power in the optical system, it is important that CXYM should satisfy the following condition:

$$CXYM<100 \qquad (4\text{-}1)$$

The curvature in the X-axis direction corresponds to the image-formation position in the X-axis direction of the effective area, and the curvature in the Y-axis direction corresponds to the image-formation position in the Y-axis direction of the effective area. The condition (4-1) is necessary to satisfy in order for astigmatism to be favorably corrected. If CXYM is not smaller than the upper limit of the condition (4-1), i.e. 100, the difference between the image-formation positions in the X- and Y-axis directions becomes excessively large, and astigmatism becomes impossible to correct by another surface.

It is more desirable to satisfy the following condition:

$$CXYM<80 \qquad (4\text{-}2)$$

It is particularly important to satisfy the condition (4-2) when the observation angle exceeds 20 degrees.

It is even more desirable to satisfy the following condition:

$$CXYM<50 \qquad (4\text{-}3)$$

It is particularly important to satisfy the condition (4-3) when the observation field angle exceeds 25 degrees.

It is still more desirable to satisfy the following condition:

$$CXYM<20 \qquad (4\text{-}4)$$

It is particularly important to satisfy the condition (4-4) when the observation field angle exceeds 30 degrees.

Next, assuming that CXYA denotes the ratio of the curvature in the X-axis direction to the curvature in the Y-axis direction, i.e. |CXn|/|CYn| (n is any of 1 to 6), of each surface at each region in the effective area on which each principal ray impinges, it is important that CXYA of all the reflecting surfaces should satisfy the following condition:

$$CXYA<100 \qquad (5\text{-}1)$$

This condition is set for the same reasons as in the case of the condition (4-1). If CXYA is not smaller than the upper limit of the condition (5-1), i.e. 100, the difference between the image-formation positions in the X- and Y-axis directions becomes excessively large, and astigmatism becomes impossible to correct by another surface. It should be noted that a surface symmetric with respect to both the Y- and X-axes, e.g. a toric surface, satisfies this condition. In this case, however, coma and image distortion occur to a considerable extent.

It is more desirable to satisfy the following condition:

$$CXYA<80 \tag{5-2}$$

It is particularly important to satisfy the condition (5-2) when the observation angle exceeds 20 degrees.

It is even more desirable to satisfy the following condition:

$$CXYA<50 \tag{5-3}$$

It is particularly important to satisfy the condition (5-3) when the observation field angle exceeds 25 degrees.

It is still more desirable to satisfy the following condition:

$$CXYA<20 \tag{5-4}$$

It is particularly important to satisfy the condition (5-4) when the observation field angle exceeds 30 degrees.

Next, conditions concerning the tilt of a reflecting surface will be shown. In a decentered optical system according to the present invention in which the principal refracting power of the whole optical system is given to a reflecting surface, which is a feature of the present invention, the occurrence of a rotationally asymmetric image distortion due to decentration gives rise to a problem. The following conditions are particularly necessary to satisfy in order to correct a trapezoidal image distortion such that the respective lengths of the upside and base of a trapezoid are made equal to each other. To correct a trapezoidal distortion, it is necessary to give a different tilt to the reflecting surface at each image position to thereby correct the distortion. The amount of tilt to be given varies subtly from place to place on the reflecting surface.

Therefore, it is important to satisfy the following condition. That is, it is desirable from the viewpoint of aberration correction to satisfy the following condition:

$$-0.2<DX46<0.2 \tag{6-1}$$

where DX46 denotes the difference DX4–DX6, in which DX4 and DX6 are the tilts in the X-axis direction at respective positions on at least one reflecting surface that are struck by the light rays ④ and ⑥ passing at the maximum field angle in the direction X.

If DX46 is not smaller than the upper limit of the condition (6-1), i.e. 0.2, or not larger than the lower limit, i.e. −0.2, the tilt of the surface in the effective area cannot satisfactorily correct image distortions due to decentration. Consequently, a distortion that is not rotationally symmetric becomes undesirably large.

It is more desirable to satisfy the following condition:

$$-0.1<DX46<0.1 \tag{6-2}$$

It is important to satisfy the condition (6-2) when the observation field angle exceeds 20 degrees.

It is even more desirable to satisfy the following condition:

$$-0.05<DX46<0.05 \tag{6-3}$$

It is important to satisfy the condition (6-3) when the observation field angle exceeds 30 degrees. Both the conditions (6-2) and (6-3) are necessary to satisfy in order to obtain a favorable image-forming performance at a wide observation field angle.

It is still more desirable that both at least two reflecting surfaces should satisfy at least one of the above conditions. As has been stated above, a decentered surface produces a rotationally asymmetric image distortion owing to the difference in height between light rays impinging on the surface. To correct the image distortion, it is important that at least two reflecting surfaces decentered with respect to the axial principal ray should satisfy at least one of the above conditions.

It is still more desirable that all the decentered reflecting surfaces should satisfy at least one of the above conditions, as a matter of course.

Next, conditions for minimizing an asymmetric image distortion due to decentration will be explained. By satisfying the following condition, it is possible to minimize an image distortion in which a horizontal straight line is imaged to be a bow-shaped line. That is, it is desirable from the viewpoint of aberration correction to satisfy the following condition:

$$0<|DY52|<0.1 \tag{7-1}$$

where DY52 is the difference DY5–DY2, in which DY2 and DY5 are the tilts of an equation defining the configuration of at least one reflecting surface in the Y-axis direction, which corresponds to the decentering direction of the surface, at respective portions where the axial principal ray ② in the Z-axis direction corresponding to the center of the image field and the principal ray ⑤ in the field angle direction corresponding to the center of the right-hand edge of the image field intersect the surface concerned.

If |DY52| is not larger than the lower limit of the condition (7-1), i.e. 0, the tilt in the Y-axis direction of the center of the right-end portion of the effective area becomes excessively small, and it becomes impossible to satisfactorily correct bow-shaped field curvature. If |DY52| is not smaller than the upper limit of the condition (7-1), i.e. 0.1, over-correction results. Consequently, the aberration occurs to a considerable extent in the reverse direction.

It is more desirable to satisfy the following condition:

$$0<|DY52|<0.05 \tag{7-2}$$

It is important to satisfy the condition (7-2) when the observation field angle exceeds 20 degrees.

It is even more desirable to satisfy the following condition:

$$0<|DY52|<0.01 \tag{7-3}$$

It is important to satisfy the condition (7-3) when the observation field angle exceeds 30 degrees. Both the conditions (7-2) and (7-3) are necessary to satisfy in order to obtain a favorable image at a wide observation field angle.

It is still more desirable that both at least two reflecting surfaces should satisfy at least one of the above conditions.

It is still more desirable that all the decentered reflecting surfaces should satisfy at least one of the above conditions, as a matter of course.

Next, it is important that at least one of two or three reflecting surfaces decentered with respect to each other in the ocular optical system should satisfy the following condition. It is an important condition to flatten curvature of field produced by a surface which is decentered and which has a power.

Assuming that CXx0 denotes each value of the differences CX4−CX1, CX5−CX2 and CX6−CX3, where CX2 is the curvature in the X-axis direction of that portion of at least one reflecting surface in the optical system which reflects the axial principal ray ②, and CXn (n is 1, and 3 to 6) are the curvatures in the X-axis direction of portions of the surface on which the rays ①, and ③ to ⑥ passing at the maximum observation field angles impinge, respectively, it is desirable from the viewpoint of aberration correction that all the values CXx0 should satisfy the following condition:

$$0<|CXx0|21\ 0.1\ (1/\text{millimeter}) \tag{8-1}$$

If |CXx0| is not smaller than the upper limit of the condition (8-1), i.e. 0.1, or not larger than the lower limit, i.e. 0, the curvatures of the surface in the effective area become excessively different from each other. Consequently, the curvature of the whole effective area of a surface having a reflective refracting power in the ocular optical system undesirably varies to an excessively large extent, making it impossible to obtain a wide and flat image throughout the observation field angle.

It is more desirable to satisfy the following condition:

$$0<|CXx0|<0.05\ (1/\text{millimeter}) \tag{8-2}$$

It is important to satisfy the condition (8-2) when the observation field angle exceeds 20 degrees.

It is even more desirable to satisfy the following condition:

$$0<|CXx0|<0.01\ (1/\text{millimeter}) \tag{8-3}$$

It is important to satisfy the condition (8-3) when the observation field angle exceeds 30 degrees. Both of the conditions (8-2) and (8-3) are necessary to be satisfied in order to obtain a favorable image at a wide observation field angle.

It is still more desirable that both of the at least two reflecting surfaces should satisfy at least one of the above conditions.

It is still more desirable that all the decentered reflecting surfaces should satisfy at least one of the above conditions, as a matter of course.

It is preferable for the conditions (8-1), (8-2) and (8-3) to be as follows:

$$0.0001<|CXx0|<0.1\ (1/\text{millimeter}) \tag{8-1'}$$

$$0.0001<|CXx0|<0.05\ (1/\text{millimeter}) \tag{8-2'}$$

$$0.0001<|CXx0|<0.01\ (1/\text{millimeter}) \tag{8-3'}$$

Next, it is important that at least one of three reflecting surfaces decentered with respect to each other in the ocular optical system should satisfy the following condition. It is an important condition to flatten curvature of field produced by a surface which is decentered and which has a power as in the case of the condition (8-1).

Assuming that CYx0 denotes each value of the differences CY4−CY1, CY5−CY2 and CY6−CY3, where CY2 is the curvature in the Y-axis direction of that portion of at least one reflecting surface in the optical system which reflects the axial principal ray ②, and CYn (n is 1, and 3 to 6) are the curvatures in the Y-axis direction of portions of the surface on which the rays ①, and ③ to ⑥ passing at the maximum observation field angles impinge, respectively, it is desirable from the viewpoint of aberration correction that all the values CYx0 should satisfy the following condition:

$$0<|CYx0|<0.01\ (1/\text{millimeter}) \tag{9-1}$$

If |CYx0| is not smaller than the upper limit of the condition (9-1), i.e. 0.1, or not larger than the lower limit, i.e. 0, the curvatures of the surface in the effective area become excessively different from each other. Consequently, the curvature of the whole effective area of a surface having a reflective refracting power in the ocular optical system undesirably varies to an excessively large extent, making it impossible to obtain a wide and flat image throughout the observation field angle.

It is more desirable to satisfy the following condition:

$$0<|CYx0|<0.05\ (1/\text{millimeter}) \tag{9-2}$$

It is important to satisfy the condition (9-2) when the observation field angle exceeds 20 degrees.

It is even more desirable to satisfy the following condition:

$$0<|CYx0|<0.01\ (1/\text{millimeter}) \tag{9-3}$$

It is important to satisfy the condition (9-3) when the observation field angle exceeds 30 degrees. Both the conditions (9-2) and (9-3) are necessary to satisfy in order to obtain a favorable image at a wide observation field angle.

It is still, more desirable that both at least two reflecting surfaces should satisfy at least one of the above conditions.

It is still more desirable that all the decentered reflecting surfaces should satisfy at least one of the above conditions.

It is preferable for the conditions (9-1), (9-2) and (9-3) to be as follows:

$$0.0001<|CYx0|<0.1\ (1/\text{millimeter}) \tag{9-1'}$$

$$0.0001<|CYx0|<0.05\ (1/\text{millimeter}) \tag{9-2'}$$

$$0.0001<|CYx0|<0.01\ (1/\text{millimeter}) \tag{9-3'}$$

Next, it is important that a surface having a particularly strong reflective refracting power in the ocular optical system should satisfy the following condition. It is an important condition to correct all aberrations produced by a surface decentered and having only one plane of symmetry with good balance and to dispose the image plane with a minimal tilt. This condition is particularly important in an optical system using two decentered concave mirrors as in the present invention.

Assuming that CXyy denotes each value of the differences CX3−CX1 and CX6−CX4, where CX2 is the curvature in the X-axis direction of that portion of at least one reflecting surface in the optical system which reflects the axial principal ray ②, and CXn (n is 1, and 3 to 6) are the curvatures in the X-axis direction of portions of each surface on which the rays ①, and ③ to ⑥ passing at the maximum observation field angles impinge, respectively, it is desirable from the viewpoint of aberration correction that all the values CXyy should satisfy the following condition:

$$0<|CXyy|<0.1\ (1/\text{millimeter}) \tag{10-1}$$

If |CXyy| is not smaller than the upper limit of the condition (10-1), i.e. 0.1, or not larger than the lower limit, i.e. 0, the curvatures of the surface in the effective area become excessively different from each other. Consequently, the curvature of the whole effective area of the second surface, which has the principal reflective refracting power in the ocular optical system, undesirably varies to an excessively large extent, making it impossible to obtain a wide and flat image throughout the observation field angle.

It is more desirable to satisfy the following condition:

$$0<|CXyy|<0.05 \text{ (1/millimeter)} \tag{10-2}$$

It is important to satisfy the condition (10-2) when the observation field angle exceeds 20 degrees.

It is even more desirable to satisfy the following condition:

$$0<|CXyy|<0.01 \text{ (1/millimeter)} \tag{10-3}$$

It is important to satisfy the condition (10-3) when the observation field angle exceeds 30 degrees. Both the conditions (10-2) and (10-3) are necessary to satisfy in order to obtain a favorable image at a wide observation field angle.

It is still more desirable that both at least two reflecting surfaces should satisfy at least one of the above conditions.

It is still more desirable that all the decentered reflecting surfaces should satisfy at least one of the above conditions.

It is preferable for the conditions (10-1), (10-2) and (10-3) to be as follows:

$$0.0001<|CXyy|<0.1 \text{ (1/millimeter)} \tag{10-1'}$$

$$0.0001<|CXyy|<0.05 \text{ (1/millimeter)} \tag{10-2'}$$

$$0.0001<|CXyy|<0.01 \text{ (1/millimeter)} \tag{10-3'}$$

Next, it is important that a surface having a particularly strong reflective refracting power in the ocular optical system should satisfy the following condition. It is an important condition to correct all aberrations produced by a surface decentered and having only one plane of symmetry with good balance as in the case of the above condition (10-1). This condition is particularly important in an optical system using two decentered concave mirrors as in the present invention.

Assuming that CYyy denotes each value of the differences CY3–CY1 and CY6–CY4, where CY2 is the curvature in the Y-axis direction of that portion of at least one reflecting surface having a reflective refracting power in the optical system which reflects the axial principal ray ②, and CYn (n is 1, and 3 to 6) are the curvatures in the Y-axis direction of portions of the surface on which the rays ①, and ③ to ⑥ passing at the maximum observation field angles impinge, respectively, it is desirable from the viewpoint of aberration correction that all the values CYyy should satisfy the following condition:

$$0<|CYyy|<0.1 \text{ (1/millimeter)} \tag{11-1}$$

If |CYyy| is not smaller than the upper limit of the condition (11-1), i.e. 0.1, or not larger than the lower limit, i.e. 0, the curvatures of the surface in the effective area become excessively different from each other. Consequently, the curvature of the whole effective area of the second surface, which has the principal reflective refracting power in the ocular optical system, undesirably varies to an excessively large extent, making it impossible to obtain a wide and flat image throughout the observation field angle.

It is more desirable to satisfy the following condition:

$$0<|CYyy|<0.05 \text{ (1/millimeter)} \tag{11-2}$$

It is important to satisfy the condition (11-2) when the observation field angle exceeds 20 degrees.

It is even more desirable to satisfy the following condition:

$$0<|CYyy|<0.01 \text{ (1/millimeter)} \tag{11-3}$$

It is important to satisfy the condition (11-3) when the observation field angle exceeds 30 degrees. Both of the conditions (11-2) and (11-3) are necessary to be satisfied in order to obtain a favorable image at a wide observation field angle.

It is still more desirable that both of the at least two reflecting surfaces should satisfy at least one of the above conditions.

It is still more desirable that all the decentered reflecting surfaces should satisfy at least one of the above conditions.

It is preferable for the conditions (11-1), (11-2) and (11-3) to be as follows:

$$0.0001<|CYyy|<0.1 \text{ (1/millimeter)} \tag{11-1'}$$

$$0.0001<|CYyy|<0.05 \text{ (1/millimeter)} \tag{11-2'}$$

$$0.0001<|CYyy|<0.01 \text{ (1/millimeter)} \tag{11-3'}$$

The above conditions (A-1) to (11-3') can be applied not only to a case where any of reflecting surfaces constituting the ocular optical system according to the present invention is formed from a plane-symmetry three-dimensional surface which has no axis of rotational symmetry in nor out of the surface and which has only one plane of symmetry, but also to a case where any of the reflecting surfaces is formed from an anamorphic surface having no axis of rotational symmetry in nor out of the surface, i.e. a non-rotationally symmetric surface configuration having no axis of rotational symmetry in nor out of the surface.

Although the foregoing various conditions have been explained mainly on the assumption that the ocular optical system uses a prism member 8 which has, as shown in FIG. 12, a first surface 3, a second surface 4, and a third surface 5 and in which the space between the three surfaces is filled with a medium having a refractive index (n) larger than 1.2 (n>1.2), it should be noted that the above conditions can be similarly applied to a prism member 8 in which incident light rays are internally reflected three times, as shown in FIGS. 11 and 1 to 6.

The above conditions (A-1) to (11-3') may be used alone or in combination to effect the desired aberration correction. However, even more favorable aberration correction can be effected by combining two or more of the conditions. Thus, the present invention also anticipates a head-mounted image display apparatus in which two or more of the conditions are combined together.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 to 7 of the head-mounted image display apparatus according to the present invention will be described below.

Figure 1:
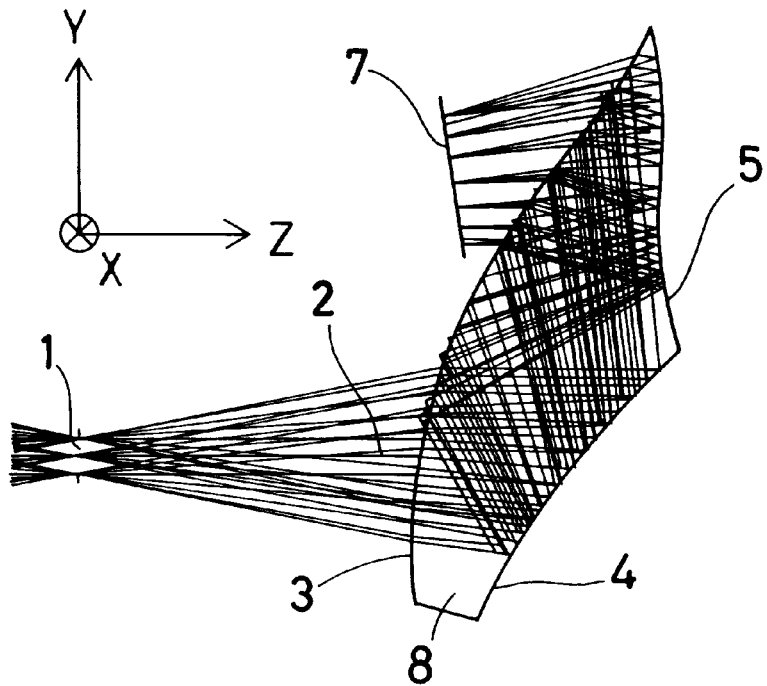
FIG. 1 is a sectional view of an optical system for a single eye of a head-mounted image display apparatus which uses an ocular optical system according to Example 1 of the present invention.

In constituent parameters of each example (described later), as shown in FIG. 1, an exit pupil 1 of a prism 8 provided as an ocular optical system is defined as the origin of the optical system, and an optical axis 2 is defined by a light ray passing through both the center of the display area of an image display device 7 and the center (the origin) of the exit pupil 1. A Z-axis is taken in a direction in which light rays travel from the exit pupil 1 along the optical axis 2. A Y-axis is taken in a direction extending through the center of the exit pupil 1 at right angles to the Z-axis in a plane in which light rays are bent by the prism 8 provided as an ocular optical system. An X-axis is taken in a direction extending through the center of the exit pupil 1 at right angles to both the Z- and Y-axes. A direction in which the Z-axis extends from the exit pupil 1 toward the prism 8 provided as an ocular optical system is defined as a positive direction of the Z-axis. A direction in which the Y-axis extends from the optical axis 2 toward the image display device 7 is defined as a positive direction of the Y-axis. A direction in which the X-axis constitutes a right-handed system in combination with the Z- and Y-axes is defined as a positive direction of the X-axis. It should be noted that ray tracing is carried out by backward tracing from the exit pupil 1 of the prism 8, which is defined as the object side, toward the image display device 7, which is defined as the image plane side.

Regarding each surface for which displacements Y and Z and tilt angle $\Theta$ are shown, the displacement Y is a distance by which the surface is displaced in the Y-axis direction from the exit pupil 1, which is the origin of the optical system, while the displacement Z is a distance by which the surface is displaced in the Z-axis direction from the exit pupil 1, and the tilt angle $\Theta$ is an angle of inclination with respect to the Z-axis. It should be noted that, for the tilt angle, the counterclockwise direction is defined as a positive direction. It should be noted that the surface separation in the constituent parameters is meaningless.

The configuration of a three-dimensional surface is defined by the following equation. The Z-axis of the defining equation is the axis of the three-dimensional surface $$Z = C_2 + C_3 y + C_4 x + C_5 y^2 + C_6 yx + C_7 x^2 + C_8 y^3 + \quad (a)$$
$$C_9 y^2 x + C_{10} yx^2 + C_{11} x^3 + C_{12} y^4 + C_{13} y^3 x + C_{14} y^2 x^2 +$$
$$C_{15} yx^3 + C_{16} x^4 + C_{17} y^5 + C_{18} y^4 x + C_{19} y^3 x^2 + C_{20} y^2 x^3 +$$
$$C_{21} yx^4 + C_{22} x^5 + C_{23} y^6 + C_{24} y^5 x + C_{25} y^4 x^2 + C_{26} y^3 x^3 +$$
$$C_{27} y^2 x^4 + C_{28} yx^5 + C_{29} x^6 + C_{30} y^7 + C_{31} y^6 x + C_{32} y^5 x^2 +$$
$$C_{33} y^4 x^3 + C_{34} y^3 x^4 + C_{35} y^2 x^5 + C_{36} yx^6 + C_{37} x^7 +$$

The term concerning an aspherical surface for which no data is shown is zero. The refractive index is expressed by the refractive index for the spectral d-line (wavelength: 587.56 nanometers). Lengths are given in millimeters.

A prism 8 provided as an ocular optical system in each of the following Examples 1 to 7 has three or four surfaces, and the space between these surfaces is filled with a medium having a refractive index larger than 1.2.

The prism 8 provided as an ocular optical system according to Example 1 is arranged as shown in the sectional view of FIG. 1 taken along the YZ-plane containing the optical axis 2. Display light from an image display device 7 enters the optical system through a first surface 3 serving as both transmitting and reflecting surfaces. The first surface 3 is a decentered surface facing both the image display device 7 and an exit pupil 1. The incident light is reflected by a third surface 5 and further reflected by the first surface 3, which serves as both transmitting and reflecting surfaces. Then, the reflected light is reflected by a second surface 4 which is a decentered reflecting surface disposed on the optical axis 2 to face the exit pupil 1. The reflected light exits from the prism 8 through the first surface 3, which serves as both transmitting and reflecting surfaces. Then, the light travels along the optical axis 2 and enters an observer's pupil placed at the exit pupil 1, without forming an intermediate image, thus forming a display image on the retina of the observer's eye.

Figure 2:
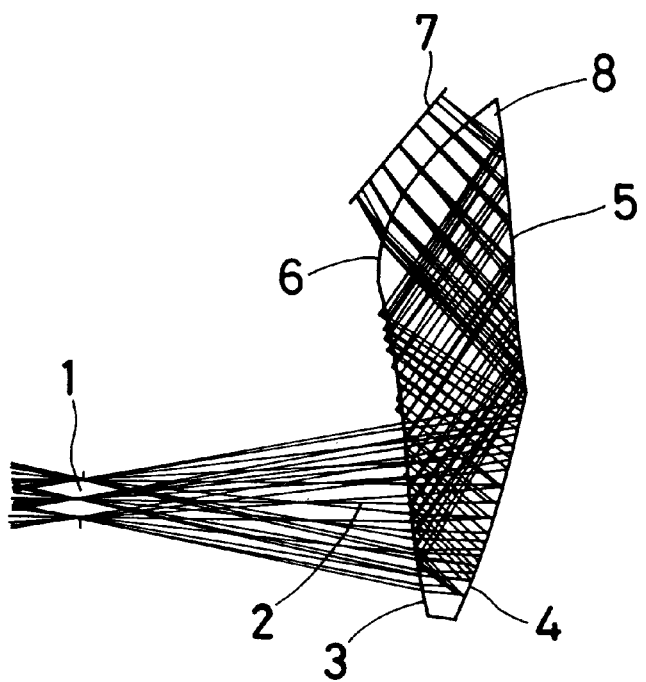
FIG. 2 is a sectional view of an optical system for a single eye of a head-mounted image display apparatus which uses an ocular optical system according to Example 2 of the present invention.

The prism 8 provided as an ocular optical system according to Example 2 is arranged as shown in the sectional view of FIG. 2 taken along the YZ-plane containing the optical axis 2. Display light from an image display device 7 enters the optical system through a fourth surface 6 which is a transmitting surface facing the image display device 7. The incident light is reflected by a third surface 5 and further reflected by a first surface 3 facing an exit pupil 1 and serving as both transmitting and reflecting surfaces. Then, the reflected light is reflected by a second surface 4 which is a decentered reflecting surface disposed on the optical axis 2 to face the exit pupil 1. The reflected light exits from the prism 8 through the first surface 3, which serves as both transmitting and reflecting surfaces. Then, the light travels along the optical axis 2 and enters an observer's pupil placed at the exit pupil 1, without forming an intermediate image, thus forming a display image on the retina of the observer's eye.

Figure 3:
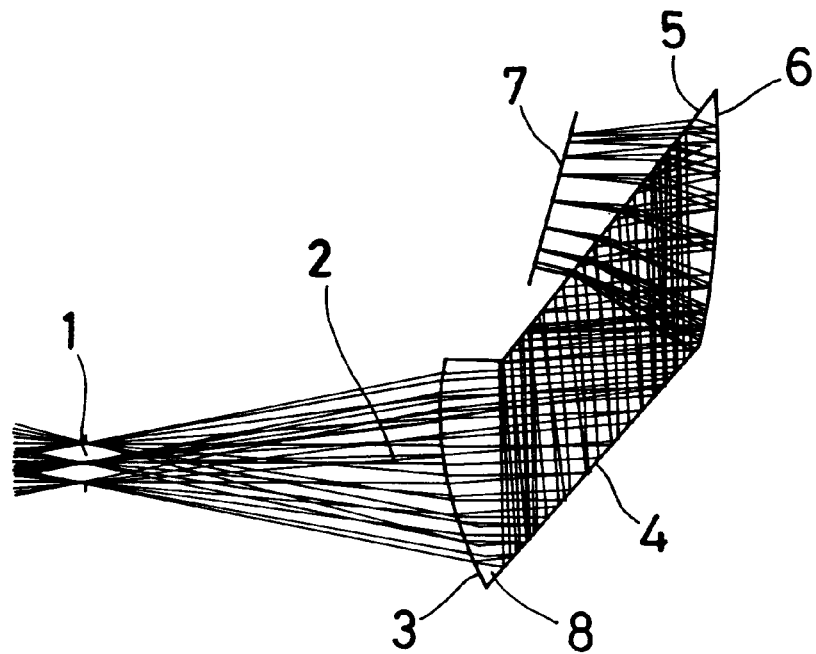
FIG. 3 is a sectional view of an optical system for a single eye of a head-mounted image display apparatus which uses an ocular optical system according to Example 3 of the present invention.

The prism 8 provided as an ocular optical system according to Example 3 is arranged as shown in the sectional view of FIG. 3 taken along the YZ-plane containing the optical axis 2. Display light from an image display device 7 enters the optical system through a third surface 5 serving as both transmitting and reflecting surfaces. The third surface 5 is a decentered surface facing the image display device 7. The incident light is reflected by a fourth surface 6 and further reflected by the third surface 5, which serves as both transmitting and reflecting surfaces. Then, the reflected light is reflected by a second surface 4 which is a decentered reflecting surface disposed on the optical axis 2 to face an exit pupil 1. The reflected light exits from the prism 8 through a first surface 3 facing the exit pupil 1, travels along the optical axis 2 and enters an observer's pupil placed at the exit pupil 1, without forming an intermediate image, thus forming a display image on the retina of the observer's eye.

Figure 4:
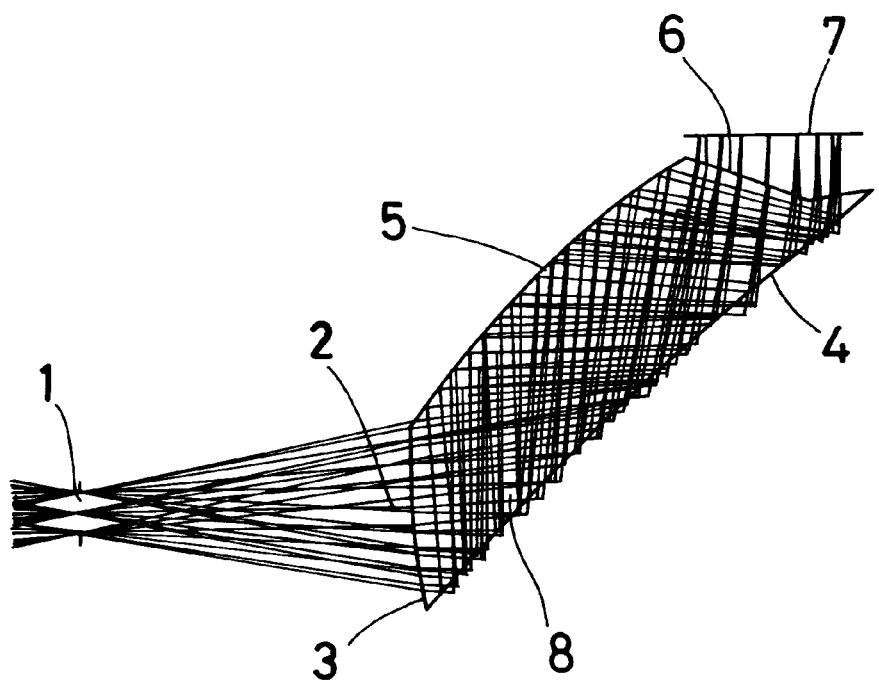
FIG. 4 is a sectional view of an optical system for a single eye of a head-mounted image display apparatus which uses an ocular optical system according to Example 4 of the present invention.

The prism 8 provided as an ocular optical system according to Example 4 is arranged as shown in the sectional view of FIG. 4 taken along the YZ-plane containing the optical axis 2. Display light from an image display device 7 enters the optical system through a fourth surface 6 which is a decentered surface facing the image display device 7. The incident light is reflected by a second surface 4 which is a decentered reflecting surface disposed on the optical axis 2 to face an exit pupil 1. Then, the reflected light is reflected by a third surface 5 and further reflected by the second surface 4. The reflected light exits from the prism 8 through a first surface 3 facing the exit pupil 1, travels along the optical axis 2 and enters an observer's pupil placed at the exit pupil 1, without forming an intermediate image, thus forming a display image on the retina of the observer's eye.

Figure 5:
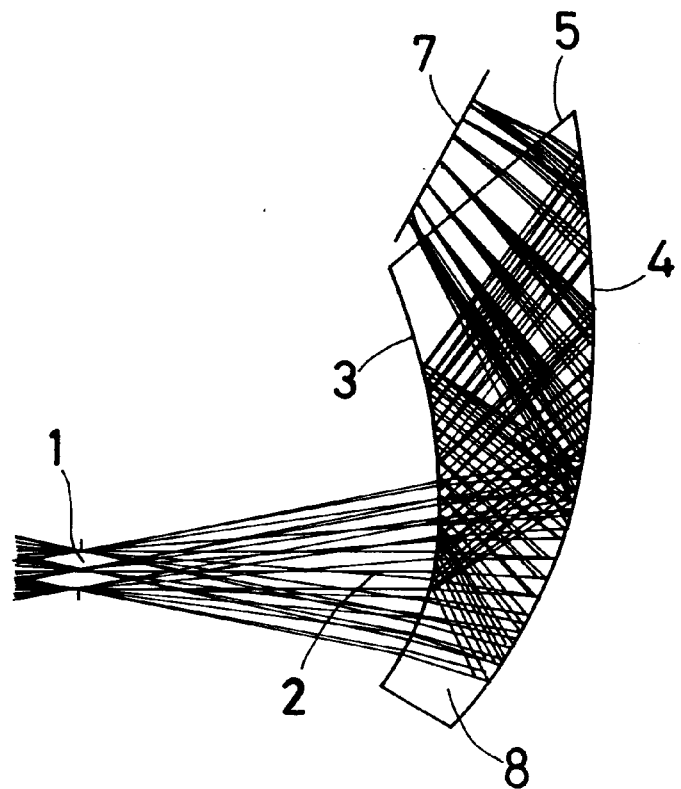
FIG. 5 is a sectional view of an optical system for a single eye of a head-mounted image display apparatus which uses an ocular optical system according to Example 5 of the present invention.

The prism 8 provided as an ocular optical system according to Example 5 is arranged as shown in the sectional view of FIG. 5 taken along the YZ-plane containing the optical axis 2. Display light from an image display device 7 enters the optical system through a third surface 5 which is a decentered surface facing the image display device 7. The incident light is reflected by a second surface 4 which is a decentered reflecting surface disposed on the optical axis 2 to face an exit pupil 1. The reflected light is reflected by a first surface 3 facing the exit pupil 1 and serving as both transmitting and reflecting surfaces. Then, the reflected light is reflected by the second surface 4 again and exits from the prism 8 through the first surface 3, which serves as both transmitting and reflecting surfaces. Then, the light travels along the optical axis 2 and enters an observer's pupil placed at the exit pupil 1, without forming an intermediate image, thus forming a display image on the retina of the observer's eye.

Figure 6:
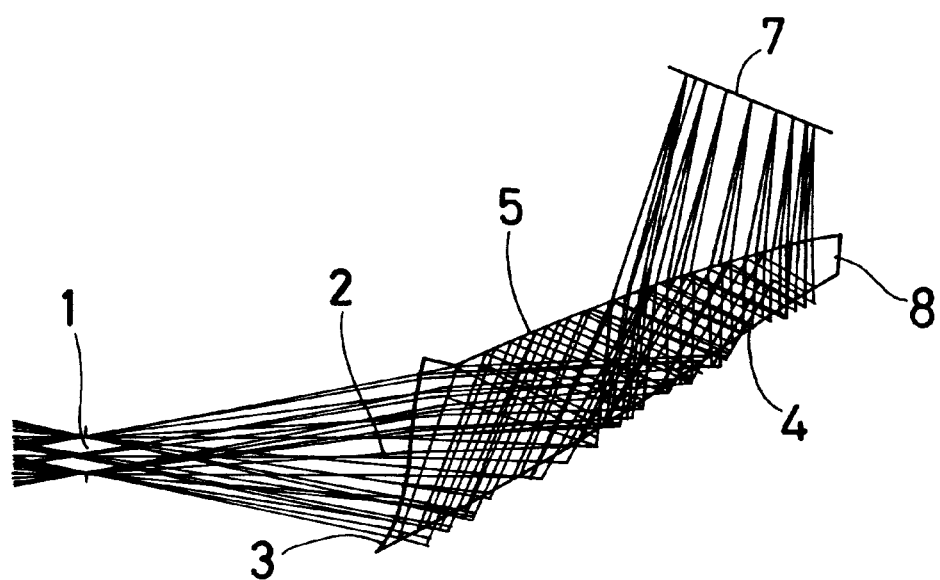
FIG. 6 is a sectional view of an optical system for a single eye of a head-mounted image display apparatus which uses an ocular optical system according to Example 6 of the present invention.

The prism 8 provided as an ocular optical system according to Example 6 is arranged as shown in the sectional view of FIG. 6 taken along the YZ-plane containing the optical axis 2. Display light from an image display device 7 enters the optical system through a third surface 5 serving as both transmitting and reflecting surfaces. The third surface 5 is a decentered surface facing the image display device 7. The incident light is reflected by a second surface 4 which is a decentered reflecting surface disposed on the optical axis 2 to face an exit pupil 1. The reflected light is reflected by the third surface 5, which serves as both transmitting and reflecting surfaces. Then, the reflected light is reflected by the second surface 4 again and exits from the prism 8 through a first surface 3 facing the exit pupil 1. Then, the light travels along the optical axis 2 and enters an observer's pupil placed at the exit pupil 1, without forming an intermediate image, thus forming a display image on the retina of the observer's eye.

Figure 7:
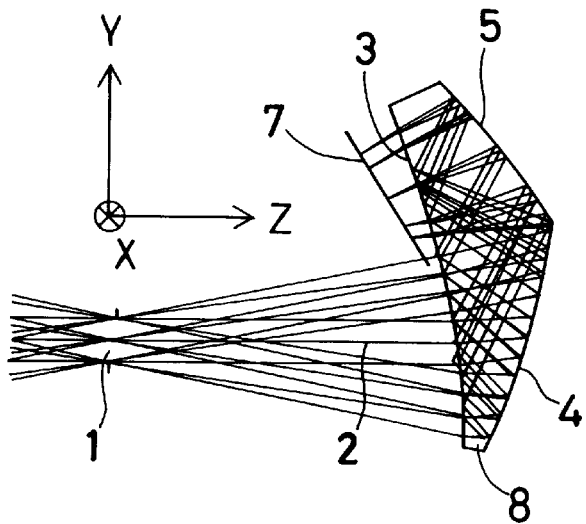
FIG. 7 is a sectional view of an optical system for a single eye of a head-mounted image display apparatus which uses an ocular optical system according to Example 7 of the present invention.

The prism a provided as an ocular optical system according to Example 7 is arranged as shown in the sectional view of FIG. 7 taken along the YZ-plane containing the optical axis 2. Display light from an image display device 7 enters the optical system through a first surface 3 serving as both transmitting and reflecting surfaces. The first surface 3 is a decentered surface disposed to face both the image display device 7 and an exit pupil 1. The incident light is reflected by a third surface 5 and further reflected by the first surface 3. The reflected light is reflected by a second surface 4 which is a decentered reflecting surface disposed on the optical axis 2 to face the exit pupil 1. The reflected light exits from the prism 8 through the first surface 3, which serves as both transmitting and reflecting surfaces. The light travels along the optical axis 2 and enters an observer's pupil placed at the exit pupil 1, without forming an intermediate image, thus forming a display image on the retina of the observer's eye.

Regarding the observation field angles in the above Examples 1 to 7, the horizontal field angle is 30.0°, and the vertical field angle is 22.72°. The pupil diameter is 4 millimeters.

Constituent parameters in Examples 1 to 6 are shown below. Regarding Example 7, a description of constituent parameters is omitted.

EXAMPLE 1

| Surface No. | Radius of curvature | Surface separation | Refractive index (Displacement) | Abbe's No. (Tilt angle) |
|---|---|---|---|---|
| 1 | ∞(pupil) | | | |
| 2 (first surface) | Three-dimensional surface(1) | | 1.5163 (from pupil position) Y 17.552 Z 46.362 | 64.15 θ −27.11° |
| 3 (second surface) (reflecting surface) | Three-dimensional surface(2) | | 1.5163 (from pupil position) Y 0.000 Z 60.051 | 64.15 θ −40.69° |
| 4 (first surface) (reflecting surface) | Three-dimensional surface(1) | | 1.5163 (from pupil position) Y 17.552 Z 46.362 | 64.15 θ −27.11° |
| 5 (third surface) (reflecting surface) | Three-dimensional surface(3) | | 1.5163 (from pupil position) Y 33.531 Z 69.044 | 64.15 θ −1.67° |
| 6 (first surface) | Three-dimensional surface(1) | | 1.5163 (from pupil position) Y 17.552 Z 46.362 | 64.15 θ −27.11° |
| 7 (display plane) | ∞ | | (from pupil position) Y 31.828 Z 44.395 | θ 10.47° |

Three-dimensional surface(1)

| | | | | | |
|---|---|---|---|---|---|
| $C_5$ | $6.7384 \times 10^{-3}$ | $C_7$ | $-4.8886 \times 10^{-3}$ | $C_8$ | $-5.6160 \times 10^{-5}$ |
| $C_{10}$ | $5.9750 \times 10^{-5}$ | $C_{12}$ | $-2.8136 \times 10^{-7}$ | $C_{14}$ | $3.0424 \times 10^{-7}$ |
| $C_{16}$ | $-1.3380 \times 10^{-6}$ | $C_{17}$ | $-2.2694 \times 10^{-8}$ | $C_{19}$ | $-2.5403 \times 10^{-8}$ |
| $C_{21}$ | $3.3240 \times 10^{-8}$ | | | | |

Three-dimensional surface(2)

| | | | | | |
|---|---|---|---|---|---|
| $C_5$ | $1.3201 \times 10^{-3}$ | $C_7$ | $-4.8490 \times 10^{-3}$ | $C_8$ | $-6.2182 \times 10^{-5}$ |
| $C_{10}$ | $3.8398 \times 10^{-5}$ | $C_{12}$ | $3.7755 \times 10^{-6}$ | $C_{14}$ | $-1.1047 \times 10^{-6}$ |
| $C_{16}$ | $-5.2333 \times 10^{-7}$ | $C_{17}$ | $-1.2224 \times 10^{-7}$ | $C_{19}$ | $1.9201 \times 10^{-8}$ |
| $C_{21}$ | $2.2457 \times 10^{-8}$ | | | | |

Three-dimensional surface(3)

| | | | | | |
|---|---|---|---|---|---|
| $C_5$ | $-9.5072 \times 10^{-4}$ | $C_7$ | $-5.8692 \times 10^{-3}$ | $C_8$ | $-2.7809 \times 10^{-4}$ |
| $C_{10}$ | $4.3619 \times 10^{-5}$ | $C_{12}$ | $-1.7424 \times 10^{-7}$ | $C_{14}$ | $5.3691 \times 10^{-7}$ |
| $C_{16}$ | $-3.7674 \times 10^{-7}$ | $C_{17}$ | $-2.0148 \times 10^{-7}$ | $C_{19}$ | $-2.0314 \times 10^{-8}$ |
| $C_{21}$ | $-3.3003 \times 10^{-9}$ | | | | |

EXAMPLE 2

| Surface No. | Radius of curvature | Surface separation | Refractive index (Displacement) | Abbe's No. (Tilt angle) |
|---|---|---|---|---|
| 1 | ∞(pupil) | | | |
| 2 (first surface) | Three-dimensional surface(1) | | 1.5163 (from pupil position) Y 19.135 Z 37.113 | 64.15 θ 10.65° |
| 3 (second surface) (reflecting surface) | Three-dimensional surface(2) | | 1.5163 (from pupil position) Y 0.000 Z 49.925 | 64.15 θ −18.07° |
| 4 (first surface) | Three-dimensional surface(1) | | 1.5163 (from pupil position) Y 19.135 | 64.15 θ 10.65° |

| Surface No. | Radius of curvature | Surface separation | Refractive index (Displacement) | Abbe's No. (Tilt angle) |
|---|---|---|---|---|
| (reflecting surface) | | | Z 37.113 | |
| 5 (third surface) (reflecting surface) | Three-dimensional surface(3) | | 1.5163 (from pupil position) Y 22.917 Z 52.129 | 64.15 θ 5.07° |
| 6 (fourth surface) | Three-dimensional surface(4) | | 1.5163 (from pupil position) Y 29.620 Z 36.431 | 64.15 θ −14.86° |
| 7 (display plane) | ∞ | | (from pupil position) Y 42.161 Z 37.935 | θ −39.86° |

Three-dimensional surface(1)

| | | | | | | |
|---|---|---|---|---|---|---|
| $C_5$ | $-3.4347 \times 10^{-3}$ | $C_7$ | $-8.8764 \times 10^{-3}$ | $C_8$ | $-7.3816 \times 10^{-5}$ | |
| $C_{10}$ | $-1.0610 \times 10^{-4}$ | $C_{12}$ | $5.2337 \times 10^{-7}$ | $C_{14}$ | $1.5427 \times 10^{-6}$ | |
| $C_{16}$ | $4.7605 \times 10^{-6}$ | $C_{17}$ | $7.5697 \times 10^{-9}$ | $C_{19}$ | $2.3825 \times 10^{-8}$ | |
| $C_{21}$ | $1.1629 \times 10^{-7}$ | | | | | |

Three-dimensional surface(2)

| | | | | | |
|---|---|---|---|---|---|
| $C_5$ | $-4.0555 \times 10^{-3}$ | $C_7$ | $-7.7891 \times 10^{-3}$ | $C_8$ | $-7.7233 \times 10^{-5}$ |
| $C_{10}$ | $-3.5364 \times 10^{-5}$ | $C_{12}$ | $1.8187 \times 10^{-6}$ | $C_{14}$ | $8.4239 \times 10^{-7}$ |
| $C_{16}$ | $7.1257 \times 10^{-7}$ | $C_{17}$ | $-3.5848 \times 10^{-8}$ | $C_{19}$ | $-2.7498 \times 10^{-8}$ |
| $C_{21}$ | $-6.2854 \times 10^{-9}$ | | | | |

Three-dimensional surface(3)

| | | | | | |
|---|---|---|---|---|---|
| $C_5$ | $6.4943 \times 10^{-4}$ | $C_7$ | $-2.9827 \times 10^{-3}$ | $C_8$ | $-8.0500 \times 10^{-5}$ |
| $C_{10}$ | $-9.1879 \times 10^{-5}$ | $C_{12}$ | $3.3950 \times 10^{-7}$ | $C_{14}$ | $1.8023 \times 10^{-6}$ |
| $C_{16}$ | $1.2366 \times 10^{-6}$ | $C_{17}$ | $3.1556 \times 10^{-9}$ | $C_{19}$ | $5.3685 \times 10^{-8}$ |
| $C_{21}$ | $1.8495 \times 10^{-7}$ | | | | |

Three-dimensional surface(4)

| | | | | | |
|---|---|---|---|---|---|
| $C_5$ | $1.2293 \times 10^{-2}$ | $C_7$ | $1.2805 \times 10^{-2}$ | $C_8$ | $1.3021 \times 10^{-4}$ |
| $C_{10}$ | $8.3388 \times 10^{-4}$ | $C_{12}$ | $2.2577 \times 10^{-5}$ | $C_{14}$ | $4.8924 \times 10^{-5}$ |
| $C_{16}$ | $-1.2627 \times 10^{-5}$ | $C_{17}$ | $-7.6625 \times 10^{-7}$ | $C_{19}$ | $-2.8210 \times 10^{-6}$ |
| $C_{21}$ | $-7.5657 \times 10^{-7}$ | | | | |

EXAMPLE 3

| Surface No. | Radius of curvature | Surface separation | Refractive index (Displacement) | Abbe's No. (Tilt angle) |
|---|---|---|---|---|
| 1 | ∞(pupil) | | | |
| 2 (first surface) | Three-dimensional surface(1) | | 1.5163 (from pupil position) Y −5.669 Z 41.377 | 64.15 θ 18.56° |
| 3 (second surface) (reflecting surface) | Three-dimensional surface(2) | | 1.5163 (from pupil position) Y −2.719 Z 54.771 | 64.15 θ −41.13° |
| 4 (third surface) (reflecting surface) | Three-dimensional surface(3) | | 1.5163 (from pupil position) Y 19.357 Z 53.431 | 64.15 θ −38.79° |
| 5 (fourth surface) (reflecting surface) | Three-dimensional surface(4) | | 1.5163 (from pupil position) Y 30.387 Z 70.488 | 64.15 θ −2.16° |
| 6 (third surface) | Three-dimensional surface(3) | | 1.5163 (from pupil position) Y 19.357 Z 53.431 | 64.15 θ −38.79° |
| 7 (display plane) | ∞ | | (from pupil position) Y 28.864 Z 52.358 | θ −15.55° |

-continued

Three-dimensional surface(1)

| | | | | | |
|---|---|---|---|---|---|
| $C_5$ | $1.4036 \times 10^{-2}$ | $C_7$ | $1.3096 \times 10^{-2}$ | $C_8$ | $9.6520 \times 10^{-5}$ |
| $C_{10}$ | $-4.9443 \times 10^{-5}$ | $C_{12}$ | $5.8568 \times 10^{-6}$ | $C_{14}$ | $-6.3526 \times 10^{-6}$ |
| $C_{16}$ | $-2.8794 \times 10^{-6}$ | $C_{17}$ | $-1.6008 \times 10^{-7}$ | $C_{19}$ | $3.3108 \times 10^{-7}$ |
| $C_{21}$ | $2.0101 \times 10^{-7}$ | | | | |

Three-dimensional surface(2)

| | | | | | |
|---|---|---|---|---|---|
| $C_5$ | $-2.7586 \times 10^{-4}$ | $C_7$ | $-1.4328 \times 10^{-3}$ | $C_8$ | $2.1477 \times 10^{-5}$ |
| $C_{10}$ | $-3.3067 \times 10^{-5}$ | $C_{12}$ | $5.2017 \times 10^{-7}$ | $C_{14}$ | $-1.6525 \times 10^{-6}$ |
| $C_{16}$ | $-1.4146 \times 10^{-6}$ | $C_{17}$ | $-1.3259 \times 10^{-8}$ | $C_{19}$ | $6.1026 \times 10^{-8}$ |
| $C_{21}$ | $5.0147 \times 10^{-8}$ | | | | |

Three-dimensional surface(3)

| | | | | | |
|---|---|---|---|---|---|
| $C_5$ | $-7.6040 \times 10^{-4}$ | $C_7$ | $-2.0256 \times 10^{-3}$ | $C_8$ | $1.4146 \times 10^{-5}$ |
| $C_{10}$ | $-3.0451 \times 10^{-5}$ | $C_{12}$ | $1.4574 \times 10^{-7}$ | $C_{14}$ | $-1.2737 \times 10^{-6}$ |
| $C_{16}$ | $-1.5338 \times 10^{-6}$ | $C_{17}$ | $-7.6929 \times 10^{-9}$ | $C_{19}$ | $7.2135 \times 10^{-8}$ |
| $C_{21}$ | $-2.3447 \times 10^{-8}$ | | | | |

Three-dimensional surface(4)

| | | | | | |
|---|---|---|---|---|---|
| $C_5$ | $-4.3654 \times 10^{-3}$ | $C_7$ | $-5.4248 \times 10^{-3}$ | $C_8$ | $3.1339 \times 10^{-6}$ |
| $C_{10}$ | $1.8242 \times 10^{-5}$ | $C_{12}$ | $7.1822 \times 10^{-7}$ | $C_{14}$ | $4.3735 \times 10^{-6}$ |
| $C_{16}$ | $2.9739 \times 10^{-7}$ | $C_{17}$ | $-2.1266 \times 10^{-8}$ | $C_{19}$ | $-8.0163 \times 10^{-10}$ |
| $C_{21}$ | $-9.0674 \times 10^{-8}$ | | | | |

EXAMPLE 4

| Surface No. | Radius of curvature | Surface separation | Refractive index (Displacement) | Abbe's No. (Tilt angle) |
|---|---|---|---|---|
| 1 | ∞(pupil) | | | |
| 2 (first surface) | Three-dimensional surface(1) | | 1.5163 (from pupil position) Y 7.607 Z 37.089 | 64.15 θ −5.98° |
| 3 (second surface) (reflecting surface) | Three-dimensional surface(2) | | 1.5163 (from pupil position) Y −8.933 Z 40.912 | 64.15 θ −45.52° |
| 4 (third surface) (reflecting surface) | Three-dimensional surface(3) | | 1.5163 (from pupil position) Y 35.670 Z 66.683 | 64.15 θ −57.88° |
| 5 (second surface) (reflecting surface) | Three-dimensional surface(2) | | 1.5163 (from pupil position) Y −8.933 Z 40.912 | 64.15 θ −45.52° |
| 6 (fourth surface) | Three-dimensional surface(4) | | 1.5163 (from pupil position) Y 36.691 Z 69.776 | 64.15 θ −108.91° |
| 7 (display plane) | ∞ | | (from pupil position) Y 39.602 Z 77.920 | θ −90.43° |

Three-dimensional surface(1)

| | | | | | |
|---|---|---|---|---|---|
| $C_5$ | $1.3319 \times 10^{-2}$ | $C_7$ | $1.7692 \times 10^{-2}$ | $C_8$ | $6.0701 \times 10^{-5}$ |
| $C_{10}$ | $2.7816 \times 10^{-4}$ | $C_{12}$ | $-9.5822 \times 10^{-6}$ | $C_{14}$ | $2.9196 \times 10^{-6}$ |
| $C_{16}$ | $-1.1194 \times 10^{-6}$ | $C_{17}$ | $9.6630 \times 10^{-8}$ | $C_{19}$ | $-4.9620 \times 10^{-7}$ |
| $C_{21}$ | $-3.0457 \times 10^{-7}$ | | | | |

Three-dimensional surface(2)

| | | | | | |
|---|---|---|---|---|---|
| $C_5$ | $-3.8316 \times 10^{-4}$ | $C_7$ | $8.2487 \times 10^{-3}$ | $C_8$ | $1.9618 \times 10^{-5}$ |
| $C_{10}$ | $3.7270 \times 10^{-5}$ | $C_{12}$ | $5.0233 \times 10^{-7}$ | $C_{14}$ | $1.4109 \times 10^{-6}$ |
| $C_{16}$ | $1.9944 \times 10^{-7}$ | $C_{17}$ | $-8.0489 \times 10^{-9}$ | $C_{19}$ | $-2.8922 \times 10^{-9}$ |
| $C_{21}$ | $-1.0774 \times 10^{-7}$ | | | | |

Three-dimensional surface(3)

| | | | | | |
|---|---|---|---|---|---|
| $C_5$ | $5.6001 \times 10^{-3}$ | $C_7$ | $1.4044 \times 10^{-2}$ | $C_8$ | $5.0336 \times 10^{-5}$ |

-continued

| | | | | | |
|---|---|---|---|---|---|
| $C_{10}$ | $8.0575 \times 10^{-5}$ | $C_{12}$ | $4.4865 \times 10^{-7}$ | $C_{14}$ | $1.1923 \times 10^{-6}$ |
| $C_{16}$ | $1.8371 \times 10^{-6}$ | $C_{17}$ | $-2.8596 \times 10^{-9}$ | $C_{19}$ | $-1.1943 \times 10^{-9}$ |
| $C_{21}$ | $8.3843 \times 10^{-9}$ | | | | |

Three-dimensional surface(4)

| | | | | | |
|---|---|---|---|---|---|
| $C_5$ | $1.5249 \times 10^{-2}$ | $C_7$ | $5.7530 \times 10^{-3}$ | $C_8$ | $-1.9551 \times 10^{-3}$ |
| $C_{10}$ | $8.9257 \times 10^{-4}$ | $C_{12}$ | $1.3878 \times 10^{-4}$ | $C_{14}$ | $-1.8390 \times 10^{-4}$ |
| $C_{16}$ | $-6.6551 \times 10^{-5}$ | $C_{17}$ | $-5.8083 \times 10^{-6}$ | $C_{19}$ | $7.5747 \times 10^{-6}$ |
| $C_{21}$ | $2.6545 \times 10^{-6}$ | | | | |

EXAMPLE 5

| Surface No. | Radius of curvature | Surface separation | Refractive index (Displacement) | Abbe's No. (Tilt angle) |
|---|---|---|---|---|
| 1 | ∞(pupil) | | | |
| 2 (first surface) | Three-dimensional surface(1) | | 1.5163 (from pupil position) Y −3.206 Z 39.348 | 64.15 θ −16.30° |
| 3 (second surface) (reflecting surface) | Three-dimensional surface(2) | | 1.5163 (from pupil position) Y 2.248 Z 54.389 | 64.15 θ −18.62° |
| 4 (first surface) (reflecting surface) | Three-dimensional surface(1) | | 1.5163 (from pupil position) Y −3.206 Z 39.348 | 64.15 θ −16.30° |
| 5 (second surface) (reflecting surface) | Three-dimensional surface(2) | | 1.5163 (from pupil position) Y 2.248 Z 54.389 | 64.15 θ −18.62° |
| 6 (third surface) | Three-dimensional surface(3) | | 1.5163 (from pupil position) Y 48.591 Z 52.571 | 64.15 θ −50.45° |
| 7 (display plane) | ∞ | | (from pupil position) Y 45.762 Z 40.624 | θ −28.52° |

Three-dimensional surface(1)

| | | | | | |
|---|---|---|---|---|---|
| $C_5$ | $-1.7079 \times 10^{-2}$ | $C_7$ | $-5.7926 \times 10^{-3}$ | $C_8$ | $1.8503 \times 10^{-4}$ |
| $C_{10}$ | $3.7567 \times 10^{-4}$ | $C_{12}$ | $-8.9953 \times 10^{-7}$ | $C_{14}$ | $-2.2631 \times 10^{-6}$ |
| $C_{16}$ | $5.3835 \times 10^{-6}$ | $C_{17}$ | $-6.1580 \times 10^{-9}$ | $C_{19}$ | $3.7283 \times 10^{-8}$ |
| $C_{21}$ | $-1.2138 \times 10^{-7}$ | | | | |

Three-dimensional surface(2)

| | | | | | |
|---|---|---|---|---|---|
| $C_5$ | $-8.2522 \times 10^{-3}$ | $C_7$ | $-4.3664 \times 10^{-3}$ | $C_8$ | $6.7995 \times 10^{-5}$ |
| $C_{10}$ | $1.4802 \times 10^{-4}$ | $C_{12}$ | $-1.1320 \times 10^{-6}$ | $C_{14}$ | $-1.1942 \times 10^{-7}$ |
| $C_{16}$ | $2.7045 \times 10^{-6}$ | $C_{17}$ | $7.2162 \times 10^{-9}$ | $C_{19}$ | $2.6926 \times 10^{-8}$ |
| $C_{21}$ | $1.9575 \times 10^{-8}$ | | | | |

Three-dimensional surface(3)

| | | | | | |
|---|---|---|---|---|---|
| $C_5$ | $-5.7112 \times 10^{-4}$ | $C_7$ | $2.7130 \times 10^{-2}$ | $C_8$ | $-6.3241 \times 10^{-4}$ |
| $C_{10}$ | $-7.0913 \times 10^{-4}$ | $C_{12}$ | $-5.0484 \times 10^{-5}$ | $C_{14}$ | $-2.6237 \times 10^{-5}$ |
| $C_{16}$ | $-8.9579 \times 10^{-6}$ | $C_{17}$ | $-1.1467 \times 10^{-6}$ | $C_{19}$ | $-1.6259 \times 10^{-7}$ |
| $C_{21}$ | $1.8924 \times 10^{-6}$ | | | | |

EXAMPLE 6

| Surface No. | Radius of curvature | Surface separation | Refractive index (Displacement) | Abbe's No. (Tilt angle) |
|---|---|---|---|---|
| 1 | ∞(pupil) | | | |
| 2 (first surface) | Three-dimensional surface(1) | | 1.5163 (from pupil position) Y 2.315 θ Z 37.208 | 64.15 −4.85° |
| 3 (second surface) (reflecting surface) | Three-dimensional surface(2) | | 1.5163 (from pupil position) Y −0.778 θ Z 51.032 | 64.15 −58.74° |
| 4 (third surface) (reflecting surface) | Three-dimensional surface(3) | | 1.5163 (from pupil position) Y 16.820 θ Z 57.526 | 64.15 −68.89° |
| 5 (second surface) (reflecting surface) | Three-dimensional surface(2) | | 1.5163 (from pupil position) Y −0.778 θ Z 51.032 | 64.15 −58.74° |
| 6 (third surface) | Three-dimensional surface(3) | | 1.5163 (from pupil position) Y 16.820 θ Z 57.526 | 64.15 −68.89° |
| 7 (display plane) | ∞ | | (from pupil position) Y 40.217 θ Z 75.684 | −112.19° |

Three-dimensional surface(1)

| | | | | | |
|---|---|---|---|---|---|
| $C_5$ | $3.0539 \times 10^{-5}$ | $C_7$ | $1.9251 \times 10^{-2}$ | $C_8$ | $8.6889 \times 10^{-4}$ |
| $C_{10}$ | $-3.1008 \times 10^{-4}$ | $C_{12}$ | $-2.2089 \times 10^{-5}$ | $C_{14}$ | $2.0005 \times 10^{-5}$ |
| $C_{16}$ | $-7.2889 \times 10^{-6}$ | $C_{17}$ | $-1.7534 \times 10^{-7}$ | $C_{19}$ | $-9.8268 \times 10^{-7}$ |
| $C_{21}$ | $6.8322 \times 10^{-7}$ | | | | |

Three-dimensional surface(2)

| | | | | | |
|---|---|---|---|---|---|
| $C_5$ | $-1.3385 \times 10^{-3}$ | $C_7$ | $1.5742 \times 10^{-2}$ | $C_8$ | $2.6376 \times 10^{-5}$ |
| $C_{10}$ | $-2.1214 \times 10^{-4}$ | $C_{12}$ | $-3.3269 \times 10^{-7}$ | $C_{14}$ | $1.4846 \times 10^{-7}$ |
| $C_{16}$ | $-4.1789 \times 10^{-6}$ | $C_{17}$ | $6.7312 \times 10^{-9}$ | $C_{19}$ | $-2.9659 \times 10^{-9}$ |
| $C_{21}$ | $1.7926 \times 10^{-7}$ | | | | |

Three-dimensional surface(3)

| | | | | | |
|---|---|---|---|---|---|
| $C_5$ | $2.0171 \times 10^{-3}$ | $C_7$ | $1.5957 \times 10^{-2}$ | $C_8$ | $2.0270 \times 10^{-6}$ |
| $C_{10}$ | $-4.3710 \times 10^{-5}$ | $C_{12}$ | $3.8091 \times 10^{-7}$ | $C_{14}$ | $-2.0061 \times 10^{-7}$ |
| $C_{16}$ | $3.3397 \times 10^{-6}$ | $C_{17}$ | $1.2492 \times 10^{-8}$ | $C_{19}$ | $-5.8514 \times 10^{-8}$ |
| $C_{21}$ | $-7.1717 \times 10^{-9}$ | | | | |

Figure 8:
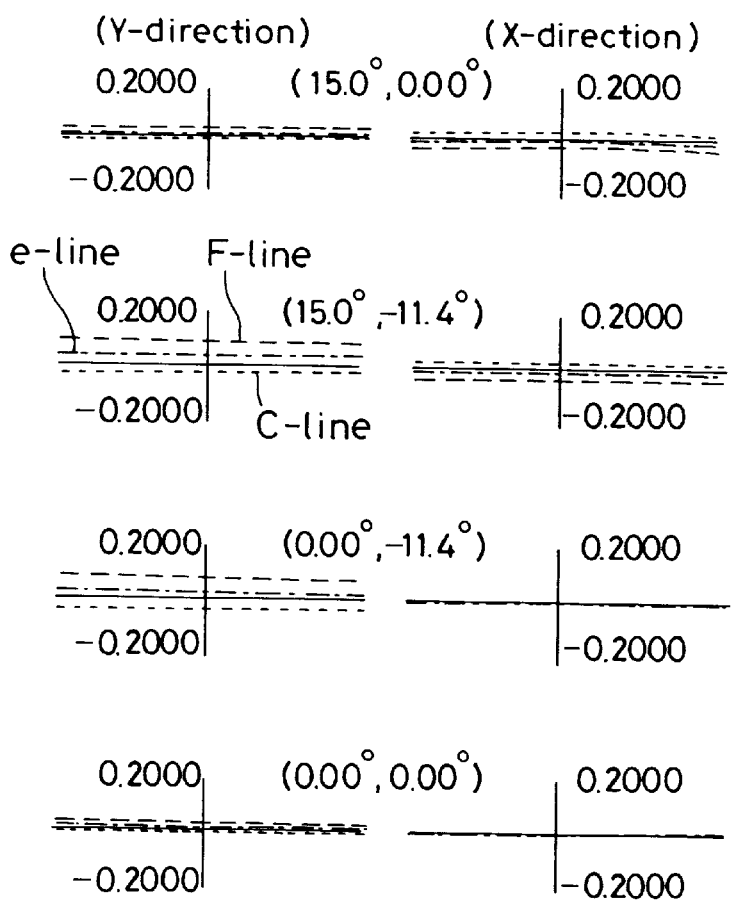
FIG. 8 is a part of an aberrational diagram illustrating lateral aberrations in the ocular optical system according to Example 2 of the present invention.
Figure 9:
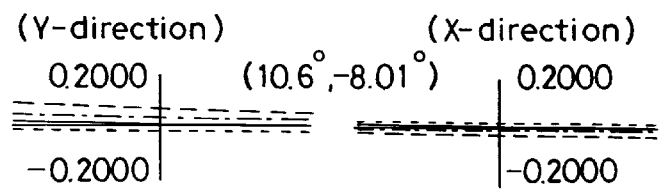
FIG. 9 is another part of the aberrational diagram illustrating lateral aberrations in the ocular optical system according to Example 2 of the present invention.
Figure 9:
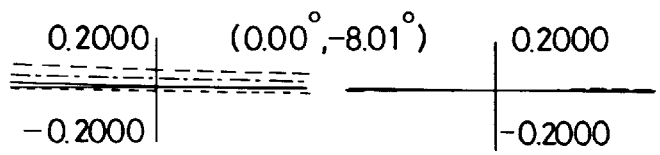
Figure 9:
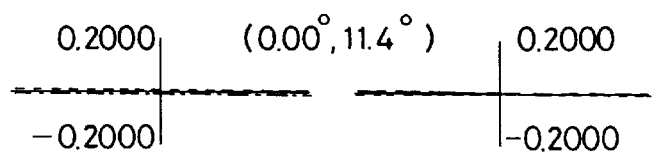
Figure 9:
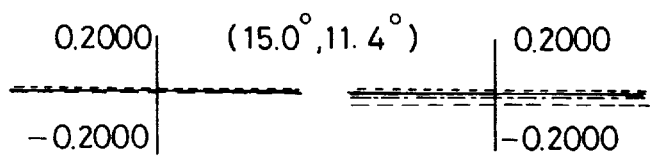
Figure 10:
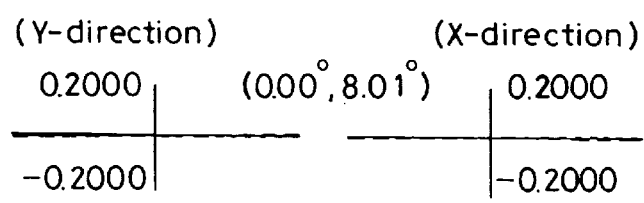
FIG. 10 is the other part of the aberrational diagram illustrating lateral aberrations in the ocular optical system according to Example 2 of the present invention.
Figure 10:
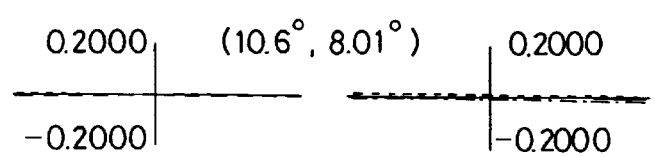
Figure 10:
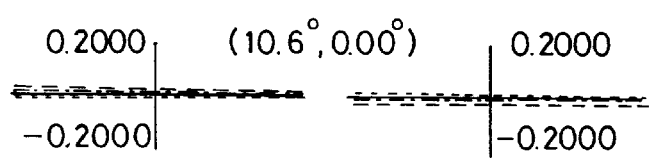
Figure 11:
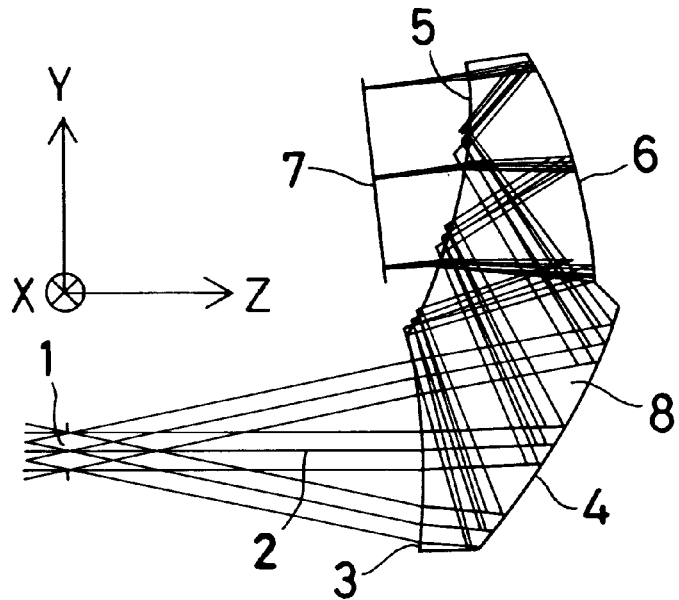
FIG. 11 is a sectional view showing one example of an ocular optical system to which the present invention can be applied.
Figure 12:
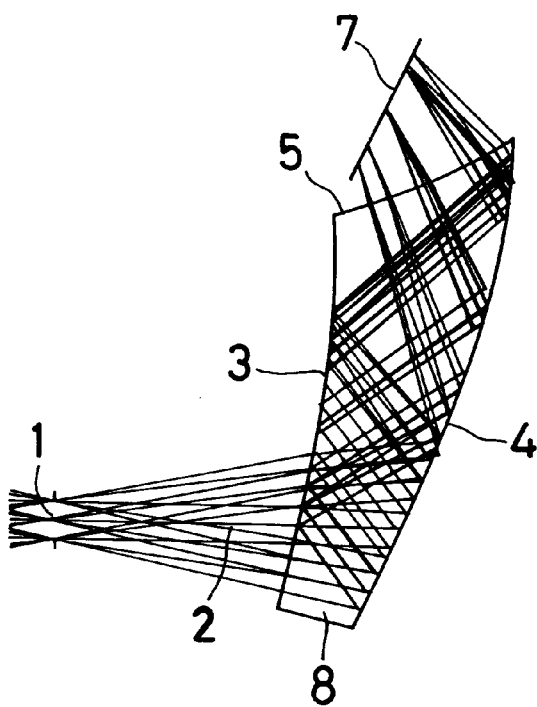
FIG. 12 is a sectional view showing another example of an ocular optical system to which the present invention can be applied.

Lateral aberrations in the above-described Example 2 are graphically shown in FIGS. 8 to 10. In these aberrational diagrams, the parenthesized numerals denote (horizontal (X-direction) field angle, vertical (Y-direction) field angle), and lateral aberrations at the field angles are shown.

Values of parameters concerning the conditions (A-1) to (11-1) in each example of the present invention are shown below (S3, S4 and S5 denote the reflecting surfaces of surface Nos. 3, 4 and 5, respectively).

| | | Example 1 | Example 2 | Example 3 |
|---|---|---|---|---|
| (A-1) | | S5 −0.012 | S3 −0.016 | S5 −0.011 |
| (B-1) | | S5 0.004 | S3 −0.008 | S5 −0.008 |
| (1-1) | | S5 −3.22 | S3 1.87 | S5 1.27 |
| (2-1) | absolute value max. | S5 CX1 0.001 | S3 CX6 0.003 | S5 CX6 0.005 |
| | absolute value min. | S5 CX5 0.000 | S3 CX1 0.000 | S5 CX4 0.000 |
| (2-4) | absolute value max. | S4 CX6 −0.007 | S5 CX4 0.008 | S5 CX6 0.005 |
| | absolute value min. | S3 CX4 0.000 | S3 CX1 0.000 | S5 CX4 0.000 |

-continued

| | | | | |
|---|---|---|---|---|
| (3-1) | absolute value max. | S5 CY1 −0.026 | S3 CY6 0.008 | S5 CY6 0.005 |
| | absolute value min. | S5 CY5 0.000 | S3 CY4 −0.003 | S5 CY1 0.000 |
| (3-4) | absolute value max. | S5 CY1 −0.026 | S3 CY6 0.008 | S5 CY6 0.005 |
| | absolute value min. | S5 CY5 0.000 | S4 CY5 0.000 | S5 CY1 0.000 |
| (4-1) | absolute value max. | S5 n = 2 −3.2 | S3 n = 6 17.1 | S5 n = 3 1.8 |
| | absolute value min. | S5 n = 3 −0.4 | S3 n = 4 1.3 | S5 n = 1 1.2 |
| (5-1) | absolute value max. | S3 n = 4 −15.1 | S3 n = 6 17.1 | S3 n = 5 75.2 |
| | absolute value min. | S5 n = 3 −0.4 | S5 n = 4 −0.3 | S5 n = 1 1.2 |
| (6-1) | | S5 0.029 | S3 −0.019 | S3 −0.012 |
| (7-1) | | S5 0.011 | S3 −0.006 | S3 −0.006 |
| (8-1) | absolute value max. | S4 CX6-CX3 −0.0043 | S5 CX4-CX1 0.0086 | S4 CX4-CX1 −0.0038 |
| | absolute value min. | S5 CX6-CX3 −0.0002 | S5 CX6-CX3 −0.0002 | S5 CX4-CX1 −0.0001 |
| (9-1) | absolute value max. | S3 CY6-CY3 −0.0012 | S5 CY4-CY1 0.0015 | S5 CY5-CY2 0.0016 |
| | absolute value min. | S5 CY6-CY3 0.0001 | S4 CY6-CY3 −0.0001 | S4 CY5-CY2 −0.0001 |
| (10-1) | absolute value max. | S4 CX6-CX4 −0.0071 | S4 CX3-CX1 0.0064 | S5 CX6-CX4 0.0049 |
| | absolute value min. | S5 CX6-CX4 −0.0012 | S3 CX3-CX1 0.0013 | S3 CX6-CX4 −0.0008 |
| (11-1) | absolute value max. | S5 CY3-CY1 0.0500 | S4 CY3-CY1 0.0125 | S3 CY6-CY4 −0.0048 |
| | absolute value min. | S3 CY6-CY4 0.0180 | S3 CY3-CY1 0.0098 | S4 CY3-CY1 −0.0017 |

| | | Example 4 | Example 5 | Example 6 |
|---|---|---|---|---|
| (A-1) | | S4 0.026 | S3 −0.010 | S4 0.032 |
| (B-1) | | S4 0.007 | S3 −0.018 | S4 0.004 |
| (1-1) | | S4 3.42 | S3 0.54 | S4 7.70 |
| (2-1) | absolute value max. | S4 CX6 −0.003 | S3 CX4 0.010 | S4 CX4 −0.005 |
| | absolute value min. | S4 CX3 −0.001 | S3 CX6 0.002 | S4 CX3 0.001 |
| (2-4) | absolute value max. | S5 CX6 −0.009 | S4 CX6 −0.021 | S3 CX4 −0.011 |
| | absolute value min. | S4 CX3 −0.001 | S5 CX6 −0.001 | S5 CX6 −0.001 |
| (3-1) | absolute value max. | S4 CY1 0.003 | S3 CY3 −0.005 | S4 CY1 0.003 |
| | absolute value min. | S4 CY5 0.000 | S3 CY5 0.000 | S4 CY3 0.000 |
| (3-4) | absolute value max. | S5 CY1 −0.006 | S4 CY6 −0.012 | S4 CY1 0.003 |
| | absolute value min. | S4 CY5 0.000 | S3 CY5 0.000 | S4 CY3 0.000 |
| (4-1) | absolute value max. | S4 n = 2 3.4 | S3 n = 3 0.6 | S4 n = 5 8.6 |
| | absolute value min. | S4 n = 4 2.4 | S3 n = 4 0.0 | S4 n = 1 3.9 |
| (5-1) | absolute value max. | S3 n = 6 −96.9 | S5 n = 4 −1.4 | S3 n = 1 45.3 |
| | absolute value min. | S4 n = 4 2.4 | S3 n = 4 0.0 | S4 n = 1 3.9 |
| (6-1) | | S3 0.029 | S3 0.098 | S4 −0.075 |
| (7-1) | | S3 0.007 | S3 0.028 | S4 −0.016 |
| (8-1) | absolute value max. | S5 CX4-CX1 −0.0100 | S4 CX4-CX1 −0.0196 | S3 CX6-CX3 −0.0153 |
| | absolute value min. | S3 CX6-CX3 −0.0008 | S3 CX6-CX3 0.0055 | S5 CX5-CX2 −0.0015 |
| (9-1) | absolute value max. | S4 CY4-CY1 −0.0006 | S4 CY5-CY2 −0.0013 | S4 CY4-CY1 −0.0030 |
| | absolute value min. | S4 CY5-CY2 0.0000 | S3 CY5-CY2 0.0001 | S3 CY4-CY1 0.0000 |
| (10-1) | absolute value max. | S5 CX3-CX1 −0.0073 | S4 CX3-CX1 −0.0130 | S3 CX3-CX1 0.0149 |
| | absolute value min. | S3 CX6-CX4 0.0004 | S3 CX6-CX4 −0.0072 | S4 CX6-CX4 0.0001 |

-continued

| (11-1) | absolute value max. | S5 CY3-CY1 0.0084 | S4 CY3-CY1 −0.0196 | S3 CY3-CY1 −0.0059 |
|---|---|---|---|---|
| | absolute value min. | S4 CY6-CY4 −0.0019 | S5 CY3-CY1 −0.0053 | S4 CY6-CY4 −0.0001 |

Although the ocular optical systems in the above examples are formed by using three-dimensional surfaces defined by the equation (a), curved surfaces defined by any defining equation, e.g. anamorphic surfaces, can be used in the present invention. No matter which defining equation is used, an ocular optical system which is considerably favorably corrected for aberrations can be obtained by satisfying any or some of the conditions shown in the present invention. It should be noted that conditional expressions which are used in conventional non-decentered systems, e.g. those for the curvature of a surface defined on the basis of the center of a coordinate system for defining a surface in which decentration is ignored, and those for the focal length of a surface, are meaningless in a case where each surface is decentered to a considerable extent as in the present invention.

Figure 13:
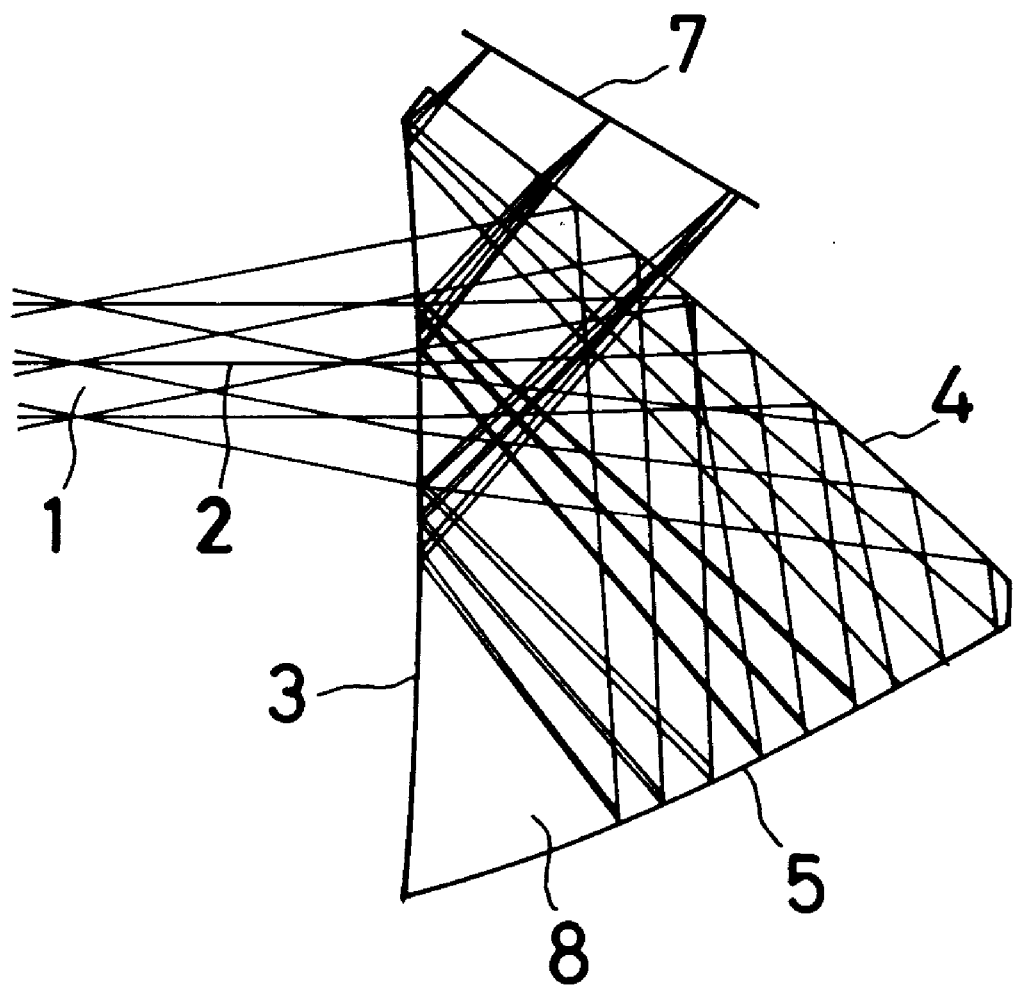
FIG. 13 is a sectional view showing still another example of an ocular optical system to which the present invention can be applied.

It should be noted that a prism arranged as shown in FIG. 13 can also be used as an ocular optical system in a head-mounted image display apparatus according to the present invention. In this case, the prism 8 used as an ocular optical system has a first surface 3, a second surface 4, and a third surface 5. A bundle of light rays emitted from an image display device 7 enters the ocular optical system 8 while being refracted by the second surface 4. The incident ray bundle is internally reflected by the first surface 3 and further internally reflected by the third surface 5. The reflected ray bundle is internally reflected by the second surface 4 and refracted by the first surface 3 so as to be projected into an observer's eyeball with the observer's iris position or eyeball rolling center as an exit pupil 1.

Figure 14:
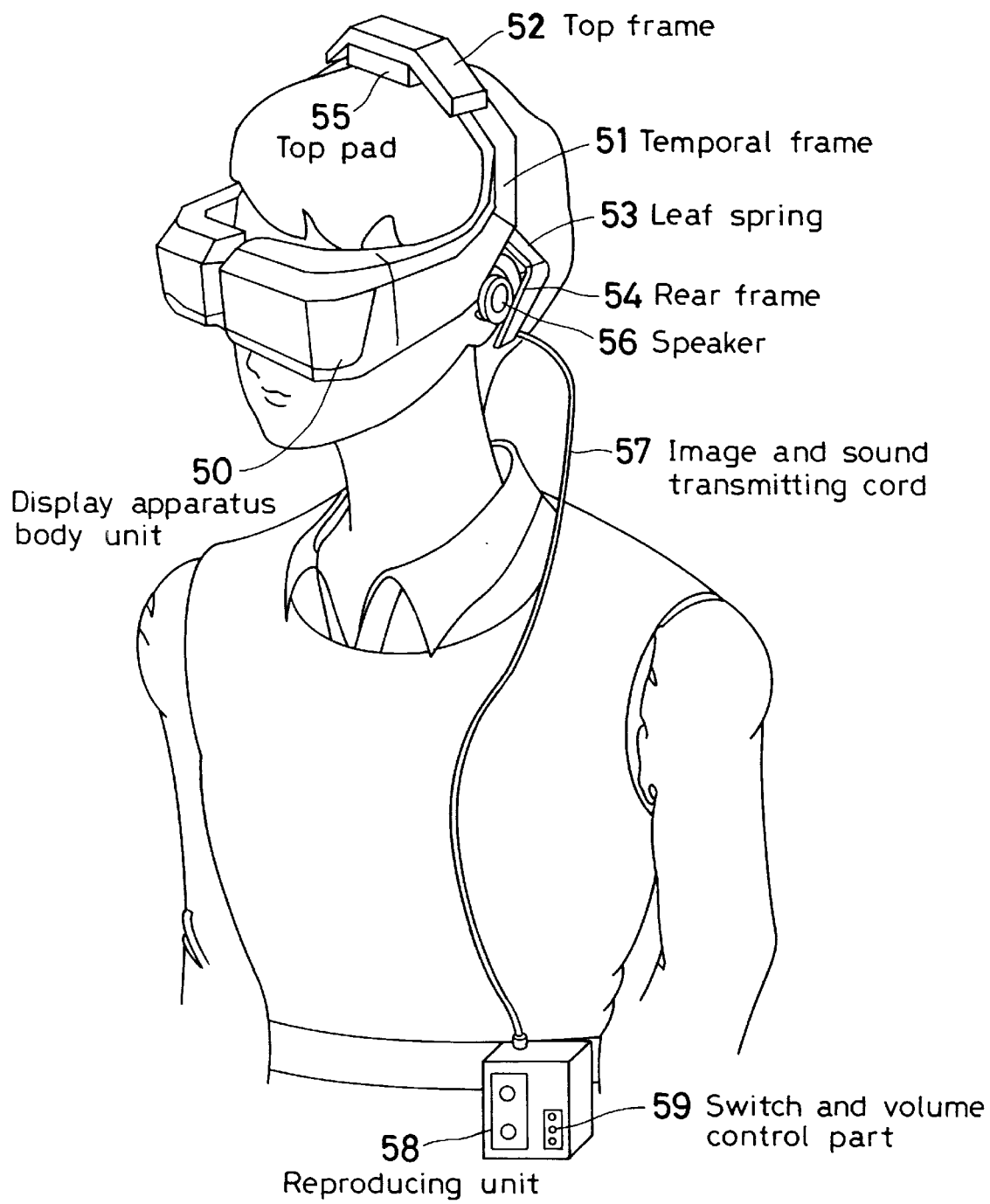
FIG. 14 shows the whole arrangement of one example of a head-mounted image display apparatus according to the present invention.
Figure 15A:
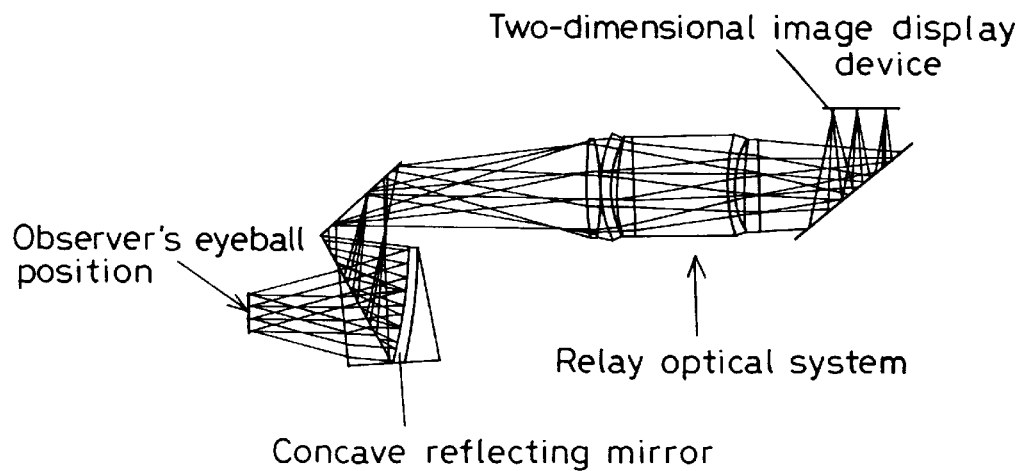
FIGS. 15(a) and 15(b) show an optical system of a conventional head-mounted image display apparatus.
Figure 15B:
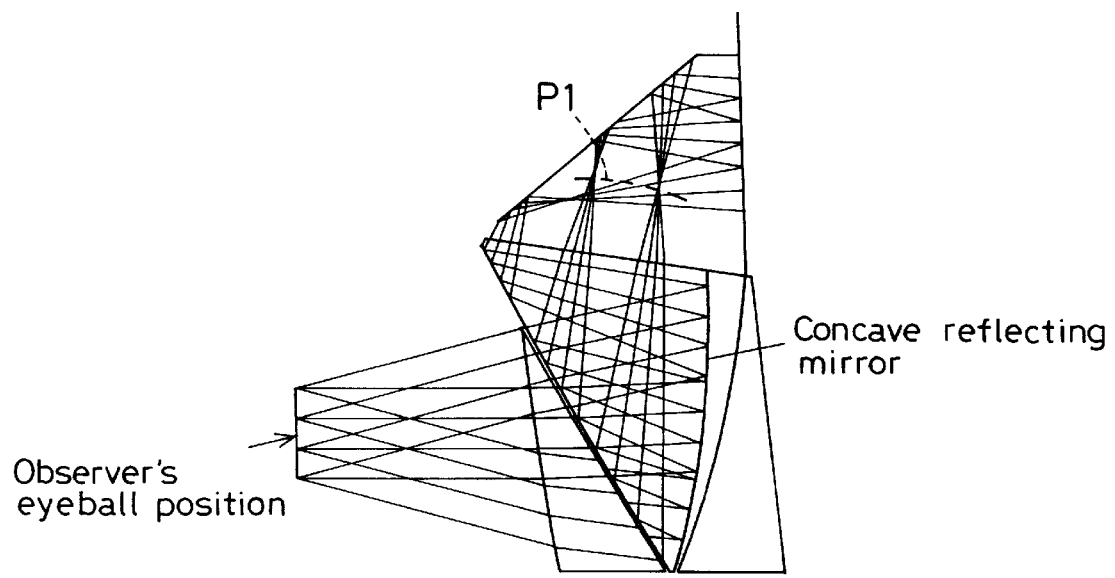
Figure 16:
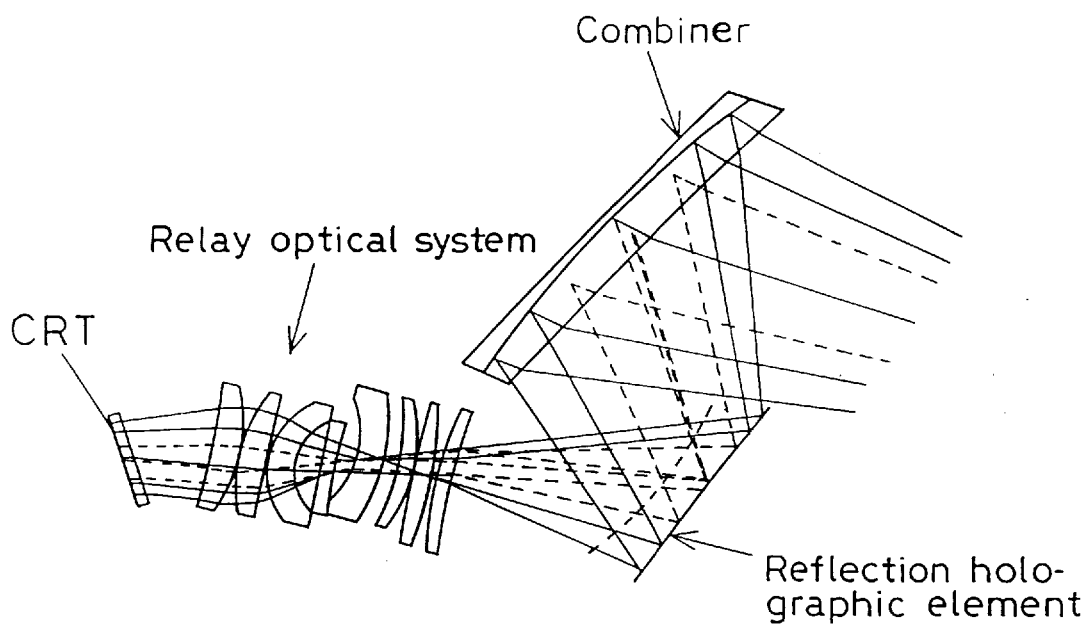
FIG. 16 shows an optical system of another conventional head-mounted image display apparatus.
Figure 17A:
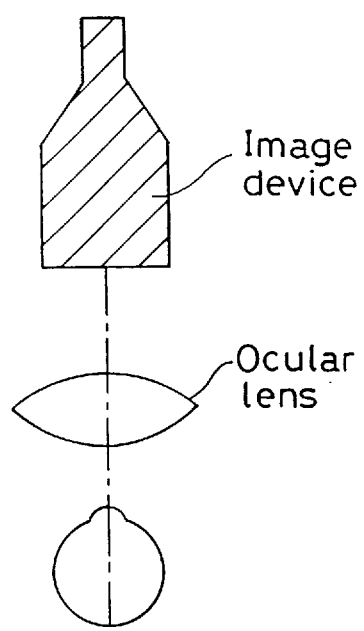
FIGS. 17(a) and 17(b) each show an optical system of still another conventional head-mounted image display apparatus.
Figure 17B:
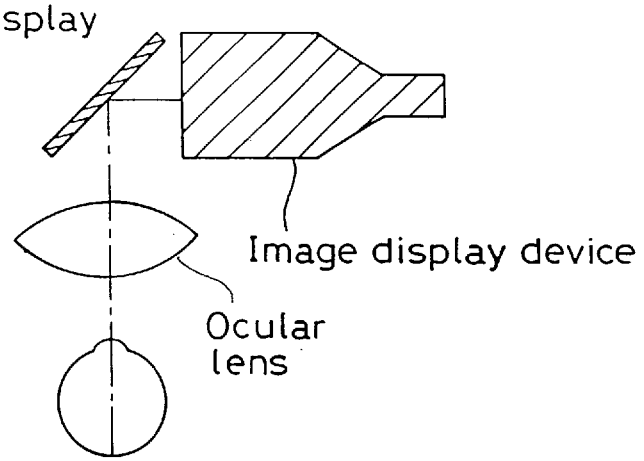
Figure 18:
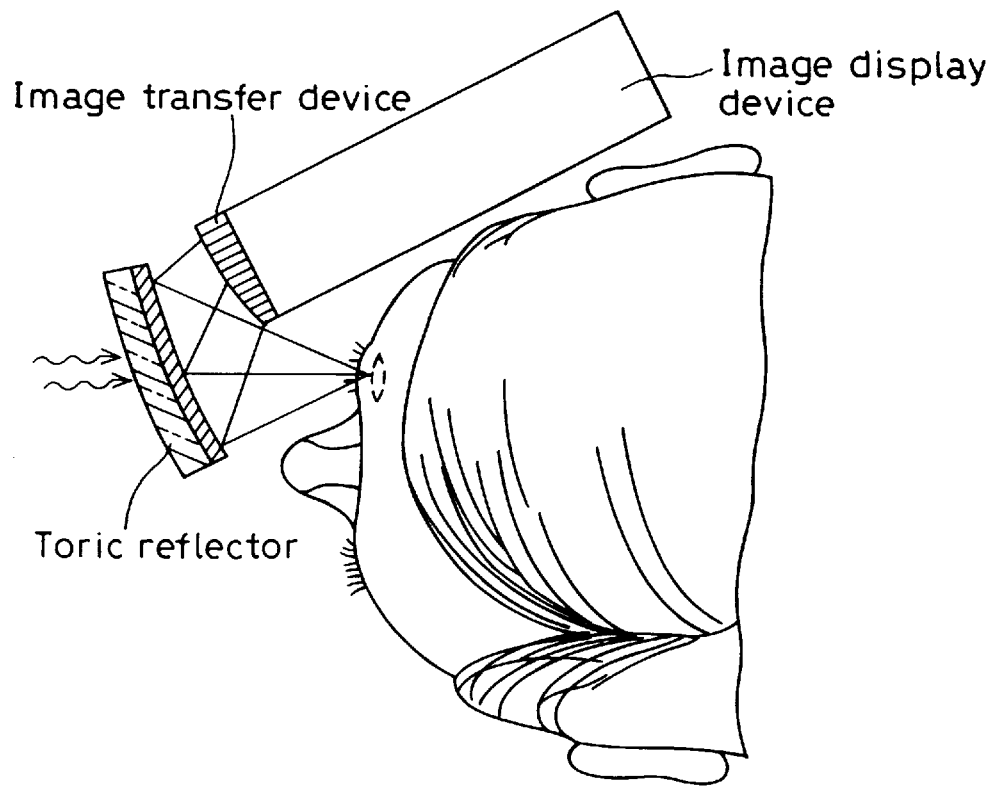
FIG. 18 shows an optical system of a further conventional head-mounted image display apparatus.
Figure 19:
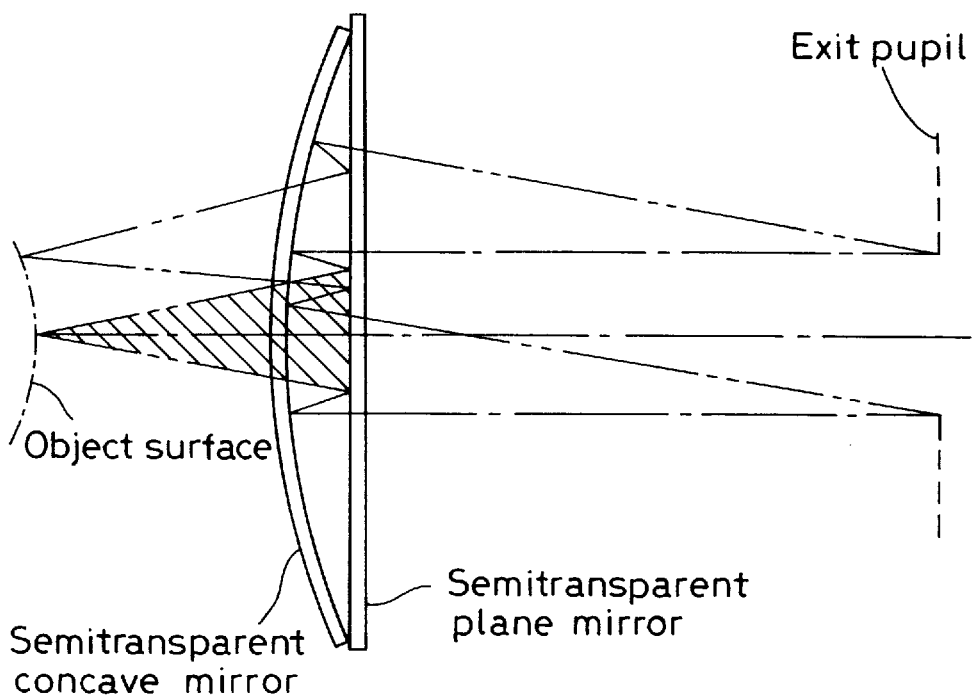
FIG. 19 shows an optical system of a still further conventional head-mounted image display apparatus.

It should be noted that it is possible to form a portable image display apparatus, such as a stationary or head-mounted image display apparatus, which enables the observer to see with both eyes by preparing a pair of combinations of an ocular optical system according to the present invention, arranged as described above, and an image display device for the left and right eyes, and supporting them apart from each other by the interpupillary distance, i.e. the distance between the two eyes. FIG. 14 shows the whole arrangement of an example of such a portable image display apparatus. A display apparatus body unit 50 contains a pair (left and right) of ocular optical systems such as those described above, and image display devices comprising liquid crystal display devices are disposed at the respective image planes of the two ocular optical systems. The apparatus body unit 50 is provided with a pair (left and right) of temporal frames 51 which are contiguous with the left and right ends of the apparatus body unit 50, as illustrated in the figure. The two temporal frames 51 are connected by a top frame 52. In addition, a rear frame 54 is attached to the intermediate portion of each temporal frame 51 through a leaf spring 53. Thus, by applying the rear frames 54 to the rear portions of the observer's ears like the temples of a pair of glasses and placing the top frame 52 on the top of the observer's head, the display apparatus body unit 50 can be held in front of the observer's eyes. It should be noted that a top pad 55, which is an elastic material such as a sponge, is attached to the inner side of the top frame 52, and a similar pad is attached to the inner side of each rear frame 54, thereby allowing the user to wear the display apparatus on his or her head without feeling uncomfortable.

Further, a speaker 56 is provided on each rear frame 54 to enable the user to enjoy listening to stereophonic sound in addition to image observation. The display apparatus body unit 50, having the speakers 56, is connected with a reproducing unit 58, e.g. a portable video cassette unit, through an image and sound transmitting cord 57. Therefore, the user can enjoy not only observing an image but also listening to sound with the reproducing unit 58 retained on a desired position, e.g. a belt, as illustrated in the figure. Reference numeral 59 in the figure denotes a switch and volume control part of the reproducing unit 58. It should be noted that the top frame 52 contains electronic parts such as image and sound processing circuits.

The cord 57 may have a jack and plug arrangement attached to the distal end thereof so that the cord 57 can be detachably connected to an existing video deck. The cord 57 may also be connected to a TV signal receiving tuner so as to enable the user to enjoy watching TV. Alternatively, the cord 57 may be connected to a computer to receive computer graphic images or message images or the like from the computer. To eliminate the bothersome cord, the image display apparatus may be arranged to receive external radio signals through an antenna connected thereto.

As will be clear from the foregoing description, the present invention makes it possible to provide a head-mounted image display apparatus that is capable of providing an observation image which is clear and has minimal distortion, even at a wide field angle.

What we claim is:

1. An image display apparatus, comprising:

an image display device; and an ocular optical system for leading an image formed by said image display device to a position of an eyeball of an observer without forming an intermediate image so that the image is observed as a virtual image, wherein said ocular optical system includes a prism member, said prism member having at least two surfaces having a reflecting action, said at least two surfaces being arranged such that light rays entering said prism member are internally reflected at least three times, wherein at least one of said at least two surfaces having a reflecting action is formed from a curved surface, and wherein said curved surface is a plane-symmetry three-dimensional surface with a rotationally asymmetric surface configuration having only one plane of symmetry.

2. An image display apparatus according to claim 1, wherein the surface configuration of said plane-symmetry three-dimensional surface is expressed by the following defining equation:

$$Z = C_2 + C_3 y + C_4 x + C_5 y^2 + C_6 yx + C_7 x^2 + C_8 y^3 + C_9 y^2 x + C_{10} yx^2 +$$
$$C_{11} x^3 + C_{12} y^4 + C_{13} y^3 x + C_{14} y^2 x^2 + C_{15} yx^3 + C_{16} x^4 + C_{17} y^5 +$$
$$C_{18} y^4 x + C_{19} y^3 x^2 + C_{20} y^2 x^3 + C_{21} yx^4 + C_{22} x^5 + C_{23} y^6 + C_{24} y^5 x +$$

-continued
$$C_{25}y^4x^2 + C_{26}y^3x^3 + C_{27}y^2x^4 + C_{28}yx^5 + C_{29}x^6 + C_{30}y^7 + C_{31}y^6x +$$
$$C_{32}y^5x^2 + C_{33}y^4x^3 + C_{34}y^3x^4 + C_{35}y^2x^5 + C_{36}yx^6 + C_{37}x^7 + \ldots$$

wherein $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$, $C_{25}$, $C_{26}$, $C_{27}$, $C_{28}$, $C_{29}$, $C_{30}$, $C_{31}$, $C_{32}$, $C_{33}$, $C_{34}$, $C_{35}$, $C_{36}$, and $C_{37}$ are constant coefficients of coordinates x and y that are selectable, wherein x, y and z are Cartesian coordinates, along the X-axis, Y-axis, and Z-axis, respectively;

wherein said plane-symmetry three-dimensional surface has only one plane of symmetry parallel to a YZ-plane, said plane-symmetry three-dimensional surface being obtained by setting coefficients of all terms with odd-numbered powers of x in the defining equation equal to zero, or said plane-symmetry three-dimensional surface has only one plane of symmetry parallel to an XZ-plane, said plane-symmetry three-dimensional surface being obtained by setting coefficients of all terms with odd-numbered powers of y in the defining equation equal to zero.

3. A head-mounted image display apparatus comprising:
an image display apparatus, comprising:
an image display device, and
an ocular optical system for leading an image formed by said image display device to a position of an eyeball of an observer without forming an intermediate image so that the image can be observed as a virtual image,
a body unit covering said image display apparatus; and
a support member provided on said body unit to support said body unit on an observer's head,
wherein said ocular optical system includes a prism member,
said prism member having at least two surfaces having a reflecting action, said at least two surfaces being arranged such that light rays entering said prism member are internally reflected at least three times,
wherein at least one of said at least two surfaces having a reflecting action is formed from a curved surface, and
wherein said curved surface is a plane-symmetry three-dimensional surface with a rotationally asymmetric surface configuration having only one plane of symmetry.

4. An image display apparatus according to claim 1, wherein said prism member has at least three optical surfaces that reflect and/or transmit light emitted from said image display device.

5. An image display apparatus according to claim 4, wherein said prism member has four optical surfaces that reflect and/or transmit light emitted from said image display device.

6. An image display apparatus according to claim 4, wherein a Z-axis is taken in a direction of prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and at least one of said reflecting surfaces constituting said ocular optical system satisfies the following condition:

$$0.05 < |CX2/CY2| < 8$$

where CY2 and CX2 denote curvatures in Y- and X-axis directions, respectively, of that portion of said reflecting surface which is struck by an axial principal ray passing through a center of an exit pupil of said ocular optical system and reaching a center of an image to be observed.

7. An image display apparatus according to claim 4, wherein a Z-axis is taken in a direction of prolongation of a line segment along which an axial principal ray from a center of an image display area of said image display device travels to reach a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and at least one of reflecting surfaces constituting said ocular optical system satisfies the following condition:

$$0 < |DY52| < 0.1$$

where DY52 denotes DY5–DY2 when a Y-axis direction is defined as a vertical direction, and DY2 and DY5 are tilts of an equation defining a configuration of said reflecting surface in a Y-axis direction, which corresponds to a decentering direction of said surface, at portions of said reflecting surface which are struck by an axial principal ray (2) in a Z-axis direction corresponding to a center of an image field and a principal ray (5) in a field angle direction corresponding to a center of a right-hand edge of the image field, respectively.

8. An image display apparatus according to claim 4, wherein a Z-axis is taken in a direction of prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and at least one of said reflecting surfaces constituting said ocular optical system satisfies the following condition:

$$0 < |CXyy| < 0.1 \text{ (1/millimeter)}$$

where CXyy denotes each value of differences CX3–CX1 and CX6–CX4 when an effective area is defined for each surface as being an area formed by intersection of the surface and six principal rays, which are, with a Y-axis direction defined as a vertical direction, an axial principal ray (2) in a Z-axis direction corresponding to a center of an image field, a principal ray (1) in a field angle direction corresponding to a center of an upper edge of the image field, a principal ray (4) in a field angle direction corresponding to an upper-right corner of the image field, a principal ray (5) in a field angle direction corresponding to a center of a right-hand edge of the image field, a principal ray (6) in a field angle direction corresponding to a lower-right corner of the image field, and a principal ray (3) in a field angle direction corresponding to a center of a lower edge of the image field, and curvatures in an X-axis direction, which perpendicularly intersects a decentering direction, of an equation defining a configuration of the surface at points in said effective area at which said six principal rays (1 to 6) strike the surface are defined as CX1, CX2, CX3, CX4, CX5, and CX6, respectively.

9. An image display apparatus according to claim 4, wherein a Z-axis is taken in a direction of prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and at least one of said reflecting surfaces constituting said ocular optical system satisfies the following condition:

$$0.001 < |CX2| \text{ (1/millimeter)}$$

where CX2 denotes a curvature in an X-axis direction of a portion of said reflecting surface which is struck by an axial principal ray passing through a center of an exit pupil of said ocular optical system and reaching a center of an image to be observed.

10. An image display apparatus according to claim 4, wherein a Z-axis is taken in a direction of prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and at least one of said reflecting surfaces constituting said ocular optical system satisfies the following condition:

$$0.001 < |CY2| \text{ (1/millimeter)}$$

where CY2 denotes a curvature in a Y-axis direction of a portion of said reflecting surface which is struck by an axial principal ray passing through a center of an exit pupil of said ocular optical system and reaching a center of an image to be observed.

11. An image display apparatus according to claim 4, wherein a Z-axis is taken in a direction of prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and a reflecting surface having a strongest reflective refracting power of reflecting surfaces constituting said ocular optical system satisfies the following condition:

$$-0.05 < CXn2 < 0.05 \text{ (1/millimeter)}$$

where CXn2 denotes each value of differences CXn−CX2, wherein n has a value of 1, 3, 4, 5 or 6 when an effective area is defined for each surface as being an area formed by intersection of the surface and six principal rays, which are, with a Y-axis direction defined as a vertical direction, an axial principal ray (2) in a Z-axis direction corresponding to a center of an image field, a principal ray (1) in a field angle direction corresponding to a center of an upper edge of the image field, a principal ray (4) in a field angle direction corresponding to an upper-right corner of the image field, a principal ray (5) in a field angle direction corresponding to a center of a right-hand edge of the image field, a principal ray (6) in a field angle direction corresponding to a lower-right corner of the image field, and a principal ray (3) in a field angle direction corresponding to a center of a lower edge of the image field, and curvatures in an X-axis direction, which perpendicularly intersects a decentering direction, of an equation defining a configuration of the surface at points in said effective area at which said six principal rays (1 to 6) strike the surface are defined as CX1, CX2, CX3, CX4, CX5, and CX6, respectively.

12. An image display apparatus according to claim 4, wherein a Z-axis is taken in a direction of prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and a reflecting surface having a strongest reflective refracting power of reflecting surfaces constituting said ocular optical system satisfies the following condition:

$$0 < |CYn2| < 0.05 \text{ (1/millimeter)}$$

where CYn2 denotes each value of differences CYn−CY2, wherein n has a value of 1, 3, 4, 5 or 6, when an effective area is defined for each surface as being an area formed by intersection of the surface and six principal rays, which are, with a Y-axis direction defined as a vertical direction, an axial principal ray (2) in a Z-axis direction corresponding to a center of an image field, a principal ray (1) in a field angle direction corresponding to a center of an upper edge of the image field, a principal ray (4) in a field angle direction corresponding to an upper-right corner of the image field, a principal ray (5) in a field angle direction corresponding to a center of a right-hand edge of the image field, a principal ray (6) in a field angle direction corresponding to a lower-right corner of the image field, and a principal ray (3) in a field angle direction corresponding to a center of a lower edge of the image field, and curvatures in a Y-axis direction, which corresponds to a decentering direction, of an equation defining a configuration of the surface at points in said effective area at which said six principal rays (1 to 6) strike the surface are defined as CY1, CY2, CY3, CY4, CY5, and CY6, respectively.

13. An image display apparatus according to claim 4, wherein a Z-axis is taken in a direction of prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and a reflecting surface having a strongest reflective refracting power of reflecting surfaces constituting said ocular optical system satisfies the following condition:

$$CXYM < 100$$

where CXYM denotes $|CXn|/|CYn|$, wherein n has a value of 1, 2, 3, 4, 5 or 6, when an effective area is defined for each surface as being an area formed by intersection of the surface and six principal rays, which are, with a Y-axis direction defined as a vertical direction, an axial principal ray (2) in a Z-axis direction corresponding to a center of an image field, a principal ray (1) in a field angle direction corresponding to a center of an upper edge of the image field, a principal ray (4) in a field angle direction corresponding to an upper-right corner of the image field, a principal ray (5) in a field angle direction corresponding to a center of a right-hand edge of the image field, a principal ray (6) in a field angle direction corresponding to a lower-right corner of the image field, and a principal ray (3) in a field angle direction corresponding to a center of a lower edge of the image field, and curvatures in a X-axis direction, which perpendicularly intersects a decentering direction, of an equation defining a configuration of the surface at points in said effective area at which said six principal rays (1 to 6) strike the surface are defined as CX1, CX2, CX3, CX4, CX5, and CX6, respectively, and further curvatures in a Y-axis direction, which corresponds to the decentering direction, of the equation at said points in said effective area are defined as CY1, CY2, CY3, CY4, CY5, and CY6, respectively.

14. An image display apparatus according to claim 4, wherein a Z-axis is taken in a direction of prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and all reflecting surfaces constituting said ocular optical system satisfy the following condition:

$$CXYA < 100$$

where CXYA denotes $|CXn|/|CYn|$, wherein n has a value of 1, 2, 3, 4, 5 or 6, when an effective area is defined for each surface as being an area formed by intersection of the surface and six principal rays, which are, with a Y-axis direction defined as a vertical direction, an axial principal ray (2) in a Z-axis direction corresponding to a center of an image field, a principal ray (1) in a field angle direction corresponding to a center of an upper edge of the image field, a principal ray (4) in a field angle direction corresponding to an upper-right corner of the image field, a principal ray (5) in a field angle direction corresponding to a center of a right-hand edge of the image field, a principal ray (6) in a field angle direction corresponding to a lower-right corner of the image field, and a principal ray (3) in a field angle direction corresponding to a center of a lower edge of the image field, and curvatures in a X-axis direction, which perpendicularly intersects a decentering direction, of an equation defining a configuration of the surface at points in said effective area at which said six principal rays (1 to 6) strike the surface are defined as CX1, CX2, CX3, CX4, CX5, and CX6, respectively, and further curvatures in a Y-axis direction, which corresponds to the decentering direction, of the equation at said points in said effective area are defined as CY1, CY2, CY3, CY4, CY5, and CY6, respectively.

15. An image display apparatus according to claim 4, wherein a Z-axis is taken in a direction of prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and at least one of reflecting surfaces constituting said ocular optical system satisfies the following condition:

$$-0.2 < DX46 < 0.2$$

where DX46 denotes DX4–DX6 when a Y-axis direction is defined as a vertical direction, and DX4 and DX6 are tilts of an equation defining a configuration of said reflecting surface in an X-axis direction, which perpendicularly intersects a decentering direction of said surface, at portions of said reflecting surface which are struck by a principal ray (4) in a field angle direction corresponding to an upper-right corner of an image field and a principal ray (6) in a field angle direction corresponding to a lower-right corner of the image field, respectively.

16. An image display apparatus according to claim 4, wherein a Z-axis is taken in a prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and at least one of reflecting surfaces constituting said ocular optical system satisfies the following condition:

$$0 < |CXx0| < 0.1 \ (1/\text{millimeter})$$

where CXx0 denotes each value of CX4–CX1, CX5–CX2 and CX6–CX3 when an effective area is defined for each surface as being an area formed by intersection of the surface and six principal rays, which are, with a Y-axis direction defined as a vertical direction, an axial principal ray (2) in a Z-axis direction corresponding to a center of an image field, a principal ray (1) in a field angle direction corresponding to a center of an upper edge of the image field, a principal ray (4) in a field angle direction corresponding to an upper-right corner of the image field, a principal ray (5) in a field angle direction corresponding to a center of a right-hand edge of the image field, a principal ray (6) in a field angle direction corresponding to a lower-right corner of the image field, and a principal ray (3) in a field angle direction corresponding to a center of a lower edge of the image field, and curvatures in an X-axis direction, which perpendicularly intersects a decentering direction, of an equation defining a configuration of the surface at points in said effective area at which said six principal rays (1 to 6) strike the surface are defined as CX1, CX2, CX3, CX4, CX5, and CX6, respectively.

17. An image display apparatus according to claim 4, wherein a Z-axis is taken in a direction of prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and at least one of said reflecting surfaces constituting said ocular optical system satisfies the following condition:

$$0 < |CYx0| < 0.1 \text{ (1/millimeter)}$$

where CYx0 denotes each value of CY4−CY1, CY5−CY2 and CY6−CY3 when an effective area is defined for each surface as being an area formed by intersection of the surface and six principal rays, which are, with a Y-axis direction defined as a vertical direction, an axial principal ray (2) in a Z-axis direction corresponding to a center of an image field, a principal ray (1) in a field angle direction corresponding to a center of an upper edge of the image field, a principal ray (4) in a field angle direction corresponding to an upper-right corner of the image field, a principal ray (5) in a field angle direction corresponding to a center of a right-hand edge of the image field, a principal ray (6) in a field angle direction corresponding to a lower-right corner of the image field, and a principal ray (3) in a field angle direction corresponding to a center of a lower edge of the image field, and curvatures in a Y-axis direction, which corresponds to a decentering direction, of an equation defining a configuration of the surface at points in said effective area at which said six principal rays (1 to 6) strike the surface are defined as CY1, CY2, CY3, CY4, CY5, and CY6, respectively.

18. An image display apparatus according to claim 4, wherein a Z-axis is taken in a direction of prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and at least one of said reflecting surfaces constituting said ocular optical system satisfies the following condition:

$$0 < |CYyy| < 0.1 \text{ (1/millimeter)}$$

where CYyy denotes each value of CY3−CY1 and CY6−CY4 when an effective area is defined for each surface as being an area formed by intersection of the surface and six principal rays, which are, with a Y-axis direction defined as a vertical direction, an axial principal ray (2) in a Z-axis direction corresponding to a center of an image field, a principal ray (1) in a field angle direction corresponding to a center of an upper edge of the image field, a principal ray (4) in a field angle direction corresponding to an upper-right corner of the image field, a principal ray (5) in a field angle direction corresponding to a center of a right-hand edge of the image field, a principal ray (6) in a field angle direction corresponding to a lower-right corner of the image field, and a principal ray (3) in a field angle direction corresponding to a center of a lower edge of the image field, and curvatures in a Y-axis direction, which corresponds to a decentering direction, of an equation defining a configuration of the surface at points in said effective area at which said six principal rays (1 to 6) strike the surface are defined as CY1, CY2, CY3, CY4, CY5, and CY6, respectively.

19. A head-mounted image display apparatus according to claim 3, wherein said prism member has at least three optical surfaces that reflect and/or transmit light emitted from said image display device.

20. A head-mounted image display apparatus according to claim 19, wherein said prism member has four optical surfaces that reflect and/or transmit light emitted from said image display device.

21. A head-mounted image display apparatus according to claim 19, wherein a Z-axis is taken in a direction of prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and at least one of said reflecting surfaces constituting said ocular optical system satisfies the following condition:

$$0.05 < |CX2/CY2| < 8$$

where CY2 and CX2 denote curvatures in Y- and X-axis directions, respectively, of that portion of said reflecting surface which is struck by an axial principal ray passing through a center of an exit pupil of said ocular optical system and reaching a center of an image to be observed.

22. A head-mounted image display apparatus according to claim 19, wherein a Z-axis is taken in a direction of prolongation of a line segment along which an axial principal ray from a center of an image display area of said image display device travels to reach a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and at least one of reflecting surfaces constituting said ocular optical system satisfies the following condition:

$$0 < |DY52| < 0.1$$

where DY52 denotes DY5−DY2 when a Y-axis direction is defined as a vertical direction, and DY2 and DY5 are tilts of an equation defining a configuration of said reflecting surface in a Y-axis direction, which corresponds to a decentering direction of said surface, at portions of said reflecting surface which are struck by an axial principal ray (2) in a Z-axis direction corresponding to a center of an image field and a principal ray (5) in a field tingle direction corresponding to a center of a right-hand edge of the image field, respectively.

23. A head-mounted image display apparatus according to claim 19, wherein a Z-axis is taken in a direction of prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and at least one of said reflecting surfaces constituting said ocular optical system satisfies the following condition:

$$0 < |CXyy| < 0.1 \text{ (1/millimeter)}$$

where CXyy denotes each value of differences CX3−CX1 and CX6−CX4 when an effective area is defined for each surface as being an area formed by intersection of the surface and six principal rays, which are, with a Y-axis direction defined as a vertical direction, an axial principal ray (2) in a Z-axis direction corresponding to a center of an image field, a principal ray (1) in a field angle direction corresponding to a center of an upper edge of the image field, a principal ray (4) in a field angle direction corresponding to an upper-right corner of the image field, a principal ray (5) in a field angle direction corresponding to a center of a right-hand edge of the image field, a principal ray (6) in a field angle direction corresponding to a lower-right corner of the image field, and a principal ray (3) in a field angle direction corresponding to a center of a lower edge of the image field, and curvatures in an X-axis direction, which perpendicularly intersects a decentering direction, of an equation defining a configuration of the surface at points in said effective area at which said six principal rays (1 to 6) strike the surface are defined as CX1, CX2, CX3, CX4, CX5, and CX6, respectively.

24. A head-mounted image display apparatus according to claim 19, wherein a Z-axis is taken in a direction of prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and at least one of said reflecting surfaces constituting said ocular optical system satisfies the following condition:

$$0.001 < |CX2| \text{ (1/millimeter)}$$

where CX2 denotes a curvature in an X-axis direction of a portion of said reflecting surface which is struck by an axial principal ray passing through a center of an exit pupil of said ocular optical system and reaching a center of an image to be observed.

25. A head-mounted image display apparatus according to claim 19, wherein, a Z-axis is taken in a direction of prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and at least one of said reflecting surfaces constituting said ocular optical system satisfies the following condition:

$$0.001 < |CY2| \text{ (1/millimeter)}$$

where CY2 denotes a curvature in a Y-axis direction of a portion of said reflecting surface which is struck by an axial principal ray passing through a center of an exit pupil of said ocular optical system and reaching a center of an image to be observed.

26. A head-mounted image display apparatus according to claim 19,
wherein a Z-axis is taken in a direction of prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and a reflecting surface having a strongest reflective refracting power of reflecting surfaces constituting said ocular optical system satisfies the following condition:

$$-0.05 < CXn2 < 0.05 \text{ (1/millimeter)}$$

where CXn2 denotes each value of difference CXn−CX2, wherein n has a value of 1, 3, 4, 5 or 6 when an effective area is defined for each surface as being an area formed by intersection of the surface and six principal rays, which are, with a Y-axis direction defined as a vertical direction, an axial principal ray (2) in a Z-axis direction corresponding to a center of an image field, a principal ray (1) in a field angle direction corresponding to a center of an upper edge of the image field, a principal ray (4) in a field angle direction corresponding to an upper-right corner of the image field, a principal ray (5) in a field angle direction corresponding to a center of a right-hand edge of the image field, a principal ray (6) in a field angle direction corresponding to a lower-right corner of the image field, and a principal ray (3) in a field angle direction corresponding to a center of a lower edge of the image field, and curvatures in an X-axis direction, which perpendicularly intersects a decentering direction, of an equation defining a configuration of the surface at points in said effective area at which said six principal rays (1 to 6) strike the surface are defined as CX1, CX2, CX3, CX4, CX5, and CX6, respectively.

27. A head-mounted image display apparatus according to claim 19, wherein a Z-axis is taken in a direction of prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and a reflecting surface having a strongest reflective refracting power of reflecting surfaces constituting said ocular optical system satisfies the following condition:

$$0 < |CYn2| < 0.05 \text{ (1/millimeter)}$$

where CYn2 denotes each value of differences CYn–CY2, wherein n has a value of 1, 3, 4, 5 or 6, when an effective area is defined for each surface as being an area formed by intersection of the surface and six principal rays, which are, with a Y-axis direction defined as a vertical direction, an axial principal ray (2) in a Z-axis direction corresponding to a center of an image field, a principal ray (1) in a field angle direction corresponding to a center of an upper edge of the image field, a principal ray (4) in a field angle direction corresponding to an upper-right corner of the image field, a principal ray (5) in a field angle direction corresponding to a center of a right-hand edge of the image field, a principal ray (6) in a field angle direction corresponding to a lower-right corner of the image field, and a principal ray (3) in a field angle direction corresponding to a center of a lower edge of the image field, and curvatures in a Y-axis direction, which corresponds to a decentering direction, of an equation defining a configuration of the surface at points in said effective area at which said six principal rays (1) to (6) strike the surface are defined as CY1, CY2, CY3, CY4, CY5, and CY6, respectively.

28. A head-mounted image display apparatus according to claim 19, wherein a Z-axis is taken in a direction of prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and a reflecting surface having a strongest reflective refracting power of reflecting surfaces constituting said ocular optical system satisfies the following condition:

$$CXYM < 100$$

where CXYM denotes $|CXn|/|CYn|$, wherein n has a value of 1, 2, 3, 4, 5 or 6, when an effective area is defined for each surface as being an area formed by intersection of the surface and six principal rays, which are, with a Y-axis direction defined as a vertical direction, an axial principal ray (2) in a Z-axis direction corresponding to a center of an image field, a principal ray (1) in a field angle direction corresponding to a center of an upper edge of the image field, a principal ray (4) in a field angle direction corresponding to an upper-right corner of the image field, a principal ray (5) in a field angle direction corresponding to a center of a right-hand edge of the image field, a principal ray (6) in a field angle direction corresponding to a lower-right corner of the image field, and a principal ray (3) in a field angle direction corresponding to a center of a lower edge of the image field, and curvatures in a X-axis direction, which perpendicularly intersects a decentering direction, of an equation defining a configuration of the surface at points in said effective area at which said six principal rays (1 to 6) strike the surface are defined as CX1, CX2, CX3, CX4, CX5, and CX6, respectively, and further curvatures in a Y-axis direction, which corresponds to the decentering direction, of the equation at said points in said effective area are defined as CY1, CY2, CY3, CY4, CY5, and CY6, respectively.

29. A head-mounted image display apparatus according to claim 19, wherein a Z-axis is taken in a direction of prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and all reflecting surfaces constituting said ocular optical system satisfy the following condition:

$$CXYA < 100$$

where CXYA denotes $|CXn|/|CYn|$, wherein n has a value of 1, 2, 3, 4, 5 or 6, when an effective area is defined for each surface as being an area formed by intersection of the surface and six principal rays, which are, with a Y-axis direction defined as a vertical direction, an axial principal ray (2) in a Z-axis direction corresponding to a center of an image field, a principal ray (1) in a field angle direction corresponding to a center of an upper edge of the image field, a principal ray (4) in a field angle direction corresponding to an upper-right corner of the image field, a principal ray (5) in a field angle direction corresponding to a center of a right-hand edge of the image field, a principal ray (6) in a field angle direction corresponding to a lower-right corner of the image field, and a principal ray (3) in a field angle direction corresponding to a center of a lower edge of the image field, and curvatures in a X-axis direction, which perpendicularly intersects a decentering direction, of an equation defining a configuration of the surface at points in said effective area at which said six principal rays (1 to 6) strike the surface are defined as CX1, CX2, CX3, CX4, CX5, and CX6, respectively, and further curvatures in a Y-axis direction, which corresponds to the decentering direction, of the equation at said points in said effective area are defined as CY1, CY2, CY3, CY4, CY5, and CY6, respectively.

30. A head-mounted image display apparatus according to claim 19, wherein a Z-axis is taken in a direction of prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and at least one of reflecting surfaces constituting said ocular optical system satisfies the following condition:

$$-0.2 < DX46 < 0.2$$

where DX46 denotes DX4–DX6 when a Y-axis direction is defined as a vertical direction, and DX4 and DX6 are tilts of an equation defining a configuration of said reflecting surface in an X-axis direction, which perpendicularly intersects a decentering direction of said surface, at portions of said reflecting surface which are struck by a principal ray (4) in a field angle direction corresponding to an upper-right corner of an image field and a principal ray (6) in a field angle direction corresponding to a lower-right corner of the image field, respectively.

31. A head-mounted image display apparatus according to claim 19, wherein a Z-axis is taken in a prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and at least one of reflecting surfaces constituting said ocular optical system satisfies the following condition:

$$0 < |CXx0| < 0.1 \text{ (1/millimeter)}$$

where CXx0 denotes each value of CX4−CX1, CX5−CX2 and CX6−CX3 when an effective area is defined for each surface as being an area formed by intersection of the surface and six principal rays, which are, with a Y-axis direction defined as a vertical direction, an axial principal ray (2) in a Z-axis direction corresponding to a center of an image field, a principal ray (1) in a field angle direction corresponding to a center of an upper edge of the image field, a principal ray (4) in a field angle direction corresponding to an upper-right corner of the image field, a principal ray (5) in a field angle direction corresponding to a center of a right-hand edge of the image field, a principal ray (6) in a field angle direction corresponding to a lower-right corner of the image field, and a principal ray (3) in a field angle direction corresponding to a center of a lower edge of the image field, and curvatures in an X-axis direction, which perpendicularly intersects a decentering direction, of an equation defining a configuration of the surface at points in said effective area at which said six principal rays (1 to 6) strike the surface are defined as CX1, CX2, CX3, CX4, CX5, and CX6, respectively.

32. A head-mounted image display apparatus according to claim 19, wherein a Z-axis is taken in a direction of prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and at least one of said reflecting surfaces constituting said ocular optical system satisfies the following condition:

$$0 < |CYx0| < 0.1 \text{ (1/millimeter)}$$

where CYx0 denotes each value of CY4−CY1, CY5−CY2 and CY6−CY3 when an effective area is defined for each surface as being an area formed by intersection of the surface and six principal rays, which are, with a Y-axis direction defined as a vertical direction, an axial principal ray (2) in a Z-axis direction corresponding to a center of an image field, a principal ray (1) in a field angle direction corresponding to a center of an upper edge of the image field, a principal ray (4) in a field angle direction corresponding to an upper-right corner of the image field, a principal ray (5) in a field angle direction corresponding to a center of a right-hand edge of the image field, a principal ray (6) in a field angle direction corresponding to a lower-right corner of the image field, and a principal ray (3) in a field angle direction corresponding to a center of a lower edge of the image field, and curvatures in a Y-axis direction, which corresponds to a decentering direction, of an equation defining a configuration of the surface at points in said effective area at which said six principal rays (1 to 6) strike the surface are defined as CY1, CY2, CY3, CY4, CY5, and CY6, respectively.

33. A head-mounted image display apparatus according to claim 19, wherein a Z-axis is taken in a direction of prolongation of a line segment along which an axial principal ray from a center of an image display area of said image display device travels to reach a center of said observer's eyeball position after exiting from said ocular optical system, a Y-axis is taken in a direction perpendicular to said Z-axis in a plane containing a folded line segment along which said axial principal ray is reflected by said reflecting surfaces, an X-axis is taken in a direction perpendicular to both said Z- and Y-axes, and at least one of said reflecting surfaces constituting said ocular optical system satisfies the following condition:

$$0 < |CYyy| < 0.1 \text{ (1/millimeter)}$$

where CYyy denotes each value of CY3−CY1 and CY6−CY4 when an effective area is defined for each surface as being an area formed by intersection of the surface and six principal rays, which are, with a Y-axis direction defined as a vertical direction, an axial principal ray (2) in a Z-axis direction corresponding to a center of an image field, a principal ray (1) in a field angle direction corresponding to a center of an upper edge of the image field, a principal ray (4) in a field angle direction corresponding to an upper-right corner of the image field, a principal ray (5) in a field angle direction corresponding to a center of a right-hand edge of the image field, a principal ray (6) in a field angle direction corresponding to a lower-right corner of the image field, and a principal ray (3) in a field angle direction corresponding to a center of a lower edge of the image field, and curvatures in a Y-axis direction, which corresponds to a decentering direction, of an equation defining a configuration of the surface at points in said effective area at which said six principal rays (1 to 6) strike the surface are defined as CY1, CY2, CY3, CY4, CY5, and CY6, respectively.

* * * * *